(12) United States Patent
Cullen et al.

(10) Patent No.: US 11,887,340 B2
(45) Date of Patent: Jan. 30, 2024

(54) DYNAMIC CALIBRATION OF 3D ACQUISITION SYSTEMS

(71) Applicant: Summer Robotics, Inc., Campbell, CA (US)

(72) Inventors: Schuyler Alexander Cullen, Santa Clara, CA (US); Gerard Dirk Smits, Los Gatos, CA (US); Steven Dean Gottke, Concord, CA (US)

(73) Assignee: Summer Robotics, Inc., Campbell, CA (US)

( * ) Notice: Subject to any disclaimer, the term of this patent is extended or adjusted under 35 U.S.C. 154(b) by 0 days.

(21) Appl. No.: 18/222,780

(22) Filed: Jul. 17, 2023

(65) Prior Publication Data
US 2023/0360268 A1 Nov. 9, 2023

Related U.S. Application Data

(63) Continuation of application No. 17/876,333, filed on Jul. 28, 2022, now Pat. No. 11,704,835.

(60) Provisional application No. 63/203,738, filed on Jul. 29, 2021.

(51) Int. Cl.
*G06T 7/80* (2017.01)

(52) U.S. Cl.
CPC ..................... *G06T 7/80* (2017.01)

(58) Field of Classification Search
CPC ................... G06T 7/80; G06T 7/85
See application file for complete search history.

(56) References Cited

U.S. PATENT DOCUMENTS

| 9,117,267 | B2 * | 8/2015 | Francis, Jr. ............... G06T 7/55 |
| 9,489,735 | B1 * | 11/2016 | Reitmayr ............. H04N 9/3164 |
| 11,704,835 | B2 | 7/2023 | Cullen et al. |

(Continued)

FOREIGN PATENT DOCUMENTS

| CN | 109458928 A | 3/2019 |
| CN | 112365585 A | 2/2021 |

(Continued)

OTHER PUBLICATIONS

Office Communication for U.S. Appl. No. 17/876,333 dated Mar. 1, 2023, pp. 1-2.

(Continued)

*Primary Examiner* — Jayanti K Patel
*Assistant Examiner* — Christopher Kingsbury Glover
(74) *Attorney, Agent, or Firm* — John W. Branch; Branch Partners PLLC

(57) ABSTRACT

Embodiments are directed to a sensing system that employs beams to scan paths across an object such that sensors may the beams reflected by the scanned object. Events may be provided based on the detected signals and the paths such that each event may be associated with a sensor and event metrics. Crossing points for each sensor may be determined based on where the paths intersect the scanned object such that events associated with each sensor are associated with the crossing points for each sensor. Each crossing point of each sensor may be compared to each correspondent crossing point of each other sensor. actual crossing points may be determined based on the comparison and the crossing points for each sensor. Position information for each sensor may be determined based on the actual crossing points.

21 Claims, 19 Drawing Sheets

(56) References Cited

U.S. PATENT DOCUMENTS

| | | | |
|---|---|---|---|
| 2008/0012850 A1* | 1/2008 | Keating, III | H04N 13/254 348/E13.016 |
| 2008/0165360 A1* | 7/2008 | Johnston | A61B 5/0062 356/394 |
| 2008/0201101 A1 | 8/2008 | Hebert et al. | |
| 2009/0096994 A1 | 4/2009 | Smits | |
| 2015/0378023 A1 | 12/2015 | Royo Royo et al. | |
| 2016/0180574 A1 | 6/2016 | Kaminitz et al. | |
| 2016/0259168 A1 | 9/2016 | Katz et al. | |
| 2017/0176575 A1 | 6/2017 | Smits | |
| 2017/0195589 A1* | 7/2017 | Kovacovsky | G06T 7/80 |
| 2019/0128665 A1 | 5/2019 | Harendt | |
| 2019/0213309 A1 | 7/2019 | Morestin et al. | |
| 2019/0279379 A1 | 9/2019 | Srinivasan et al. | |
| 2021/0141094 A1 | 5/2021 | Russ et al. | |
| 2022/0156998 A1 | 5/2022 | Lee et al. | |
| 2022/0187461 A1 | 6/2022 | Cullen | |
| 2022/0287676 A1 | 9/2022 | Steines et al. | |
| 2023/0003549 A1 | 1/2023 | Paden | |
| 2023/0015889 A1 | 1/2023 | Cullen et al. | |
| 2023/0034733 A1 | 2/2023 | Cullen et al. | |
| 2023/0060421 A1 | 3/2023 | Cullen et al. | |
| 2023/0169683 A1 | 6/2023 | Paden et al. | |

FOREIGN PATENT DOCUMENTS

| | | |
|---|---|---|
| CN | 112750168 A | 5/2021 |
| CN | 113313710 A | 8/2021 |
| JP | H06-94428 A | 4/1994 |
| JP | 2009-243986 A | 10/2009 |
| JP | 2018-195240 A | 12/2018 |
| JP | 2020-052719 A | 4/2020 |
| JP | 2020-064011 A | 4/2020 |
| JP | 2020-106475 A | 7/2020 |
| JP | 2021-167776 A | 10/2021 |
| WO | 2018/000037 A1 | 1/2018 |
| WO | 2018/125850 A1 | 7/2018 |
| WO | 2019/189381 A1 | 10/2019 |
| WO | 2020/080237 A1 | 4/2020 |
| WO | 2021/039022 A1 | 3/2021 |
| WO | 2021/140886 A1 | 7/2021 |
| WO | 2022/132828 A1 | 6/2022 |
| WO | 2023/278868 A1 | 1/2023 |
| WO | 2023/288067 A1 | 1/2023 |
| WO | 2023/009755 A1 | 2/2023 |
| WO | 2023/028226 A1 | 3/2023 |
| WO | 2023/096873 A1 | 6/2023 |

OTHER PUBLICATIONS

International Preliminary Report on Patentability for International Patent Application No. PCT/US2021/063399 dated Jun. 29, 2023, pp. 1-5.

International Search Report and Written Opinion for International Patent Application No. PCT/US2021/063399 dated Mar. 22, 2022, pp. 1-6.

International Search Report and Written Opinion for International Patent Application No. PCT/US2022/036006 dated Oct. 4, 2022, pp. 1-7.

International Search Report and Written Opinion for International Patent Application No. PCT/US2022/037299 dated Oct. 25, 2022, pp. 1-6.

International Search Report and Written Opinion for International Patent Application No. PCT/US2022/038724 dated Nov. 1, 2022, pp. 1-6.

International Search Report and Written Opinion for International Patent Application No. PCT/US2022/041520 dated Nov. 8, 2022, pp. 1-6.

International Search Report and Written Opinion for International Patent Application No. PCT/US2022/050626 dated Mar. 7, 2023, pp. 1-8.

International Search Report and Written Opinion for International Patent Application No. PCT/US2023/013718 dated May 30, 2023, pp. 1-7.

International Search Report and Written Opinion for International Patent Application No. PCT/US2023/015227 dated Jun. 27, 2023, pp. 1-7.

Office Communication for U.S. Appl. No. 17/895,489 dated Apr. 11, 2023, pp. 1-36.

Office Communication for U.S. Appl. No. 18/130,080 dated Jun. 20, 2023, pp. 1-36.

Office Communication for U.S. Appl. No. 17/876,333 dated Feb. 21, 2023, pp. 1-22.

Office Communication for U.S. Appl. No. 17/895,489 dated Jul. 5, 2023, pp. 1-13.

International Search Report and Written Opinion for International Patent Application No. PCT/US2023/017271 dated Jul. 11, 2023, pp. 1-7.

* cited by examiner

DYNAMIC CALIBRATION OF 3D ACQUISITION SYSTEMS

CROSS-REFERENCE TO RELATED APPLICATION

This Utility Patent Application is a Continuation of U.S. patent application Ser. No. 17/876,333 filed on Jul. 28, 2022, now U.S. Pat. No. 11,704,835 issued on Jul. 18, 2023, which is based on previously filed U.S. Provisional Patent Application U.S. Ser. No. 63/203,738 filed on Jul. 29, 2021, the benefit of the filing date of which is hereby claimed under 35 U.S.C. § 119(e) and § 120, and the contents of these applications are herein incorporated by reference in their entirety.

TECHNICAL FIELD

The present invention relates generally to machine sensing or machine vision systems, and more particularly, but not exclusively, to dynamic calibration of 3D acquisition systems.

BACKGROUND

The state of the art in robotic vision is largely based on cameras where the input to the sensing system is two-dimensional (2D) arrays of pixels that encode the amount of light that each pixel received over an exposure period, or on depth capture technologies (e.g., Time-of-Flight (ToF) cameras, structured light cameras, LIDAR, RADAR, or stereo cameras, to name a few) which provide three-dimensional (3D) point clouds, where each point in the point cloud may store its position in space with respect to the vision system, and may store any of a number of other data associated with the patch of reflecting material that the point was generated from (e.g., brightness, color, relative radial velocity, spectral composition, to name a few). Note that 3D point clouds may be represented in "frames", similar in spirit to the frames of images from cameras, meaning that they don't have a fundamental representation of continuously evolving time.

To provide useful perception output that may be used by a machine vision applications, such as, robotic planning and control systems, these 2D or 3D data often need to be processed by machine vision algorithms implemented in software or hardware. In some cases, some machine vision systems may employ machine learning to determine properties or features of the world that may be salient to particular robotic tasks, such as, the location, shape orientation, material properties, object classification, object motion, relative motion of the robotic system, or the like. In many cases, neither the 2D nor 3D representations employed by conventional machine vision systems provide inherent/native support for continuous surface representation of objects in the environment. Sensors employed in machine learning system often require various parameters or characteristics to be calibrated. Such calibration may be directed to performance variation across sensors, environment conditions, different requirements for different applications, and so on. In some cases, calibration may be laborious or time consuming and often may require manual interventions. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
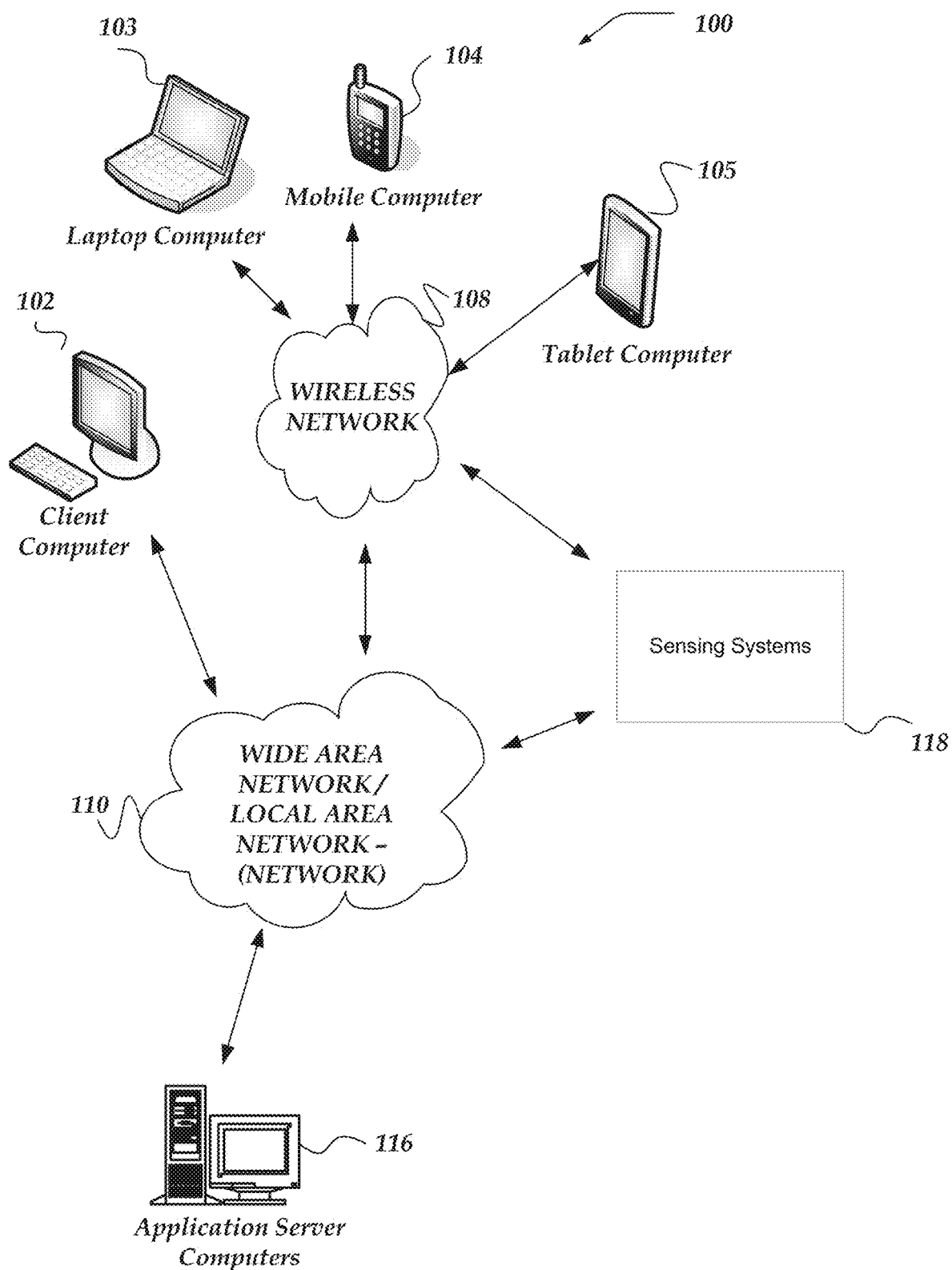
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "scanning signal generator" refers to a system or device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generator are not strictly limited to lasers or laser MEMS, other type of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan up to frequencies of 10s of kHz. The scanning signal generators may be controlled in a closed loop fashion with one or more processor that may provide feedback about objects in the environment and instructs the scanning signal generator to modify its amplitudes, frequencies, phase, or the like.

As used herein the term "sensor" refers to a device or system that can detect reflected energy from scanning signal generator. Sensors may be considered to comprise an array of detector cells that are responsive to energy reflected from scanning signal generators. Sensors may provide outputs that indicate which detector cells are triggered and the time they are triggered. Sensors may be considered to generate a sensor output that reports the cell location and time of detection for individual cell rather than being limited reporting the state or status of every cell. For example, sensors may include event sensor cameras, SPAD arrays, SiPM arrays, or the like.

As used herein the terms "trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to dynamic calibration of 3D acquisition systems in accordance with one or more of the various embodiments.

In one or more of the various embodiments, a sensing system that employs one or more signal beams to scan a plurality of paths across an object may be provided such that two or more sensors may detect signals from the one or more signal beams reflected by the scanned object.

In one or more of the various embodiments, a plurality of events may be provided based on the detected signals and the plurality of paths such that each event may be associated with one of the two or more sensors and one or more event metrics.

In one or more of the various embodiments, a plurality of crossing points for each sensor may be determined based on where the plurality of paths intersect the scanned object and a time of the intersection such that one or more events associated with each sensor are associated with the plurality of crossing points for each sensor.

In one or more of the various embodiments, each crossing point of each sensor may be compared to each correspondent crossing point of each other sensor based on the one or more event metrics.

In one or more of the various embodiments, position information for each sensor may be determined based on a position of the one or more actual crossing points.

In one or more of the various embodiments, the sensing system may be calibrated based on the determined position information.

In one or more of the various embodiments, providing the plurality of events may include: determining a location of each event based on one of the two or more sensors that detects the reflected signals that corresponds to the event; determining a time of each event based on the time that the reflected signals are detected by the one of the two or more sensors; including the determined location and the determined time in the one or more event metrics; or the like.

In one or more of the various embodiments, each event may be assigned to an individual trajectory based on a fit to a line or other continuous curve such that the fit of each trajectory may be done individually for each sensor and such that each trajectory may be a same coordinate system of each sensor to approximate a shape of a path traced by the signal generator as reflected from each sensor.

In one or more of the various embodiments, determining the plurality of crossing points for each sensor may include: providing a plurality of trajectories associated with each sensor based on the plurality of events and the plurality of paths; determining a first portion of the plurality of trajectories and a second portion of the plurality of trajectories based on one or more of a number of crossings among the first portion of trajectories and the second portion of trajectories, the object, a relative orientation of the first portion of trajectories and the second portion of trajectories, a number of sensors that are sensing related events that comprise the plurality of trajectories, or the like; determining the one or more crossing points between the first portion of trajectories and the second portion of trajectories based on one or more curves that correspond to each trajectory in the first portion of trajectories and the second portion of trajectories; or the like.

In one or more of the various embodiments, determining one or more actual crossing points may include: determining a time associated with each crossing point for each sensor based on the plurality of events and the one or event metrics; determining one or more absolute time offsets between each sensor based on the time associated with each crossing point for each sensor; employing the one or more absolute time offsets to synchronize the crossing points across the two or more sensors; or the like.

In one or more of the various embodiments, calibrating the sensing system based on the determined positioning information may include, determining a position and a rotation angle for each degree-of-freedom for each sensor based on the position in a coordinate system that corresponds to each actual crossing point.

In one or more of the various embodiments, two or more signal beams from two or more signal generators may be employed to scan the plurality of paths across the object. In some embodiments, at least one signal generator of the two or more signal generators may be configured to generate a beam with one or more characteristics that may distinguish it from the one or more signal generators such that the one or more characteristics may include one or more of a different scanning path, a different signal frequency, a different signal pulse-pattern, or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, application server computer 116, sensing systems 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, sensing systems 118, or other computers.

Client computers 102-105 may further be configured to include a client application that enables an end-user to log into an end-user account that may be managed by another computer, such as application server computer 116, sensing systems 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, sensing systems 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or sensing systems 118 are described in more detail below in conjunction with FIG. 3. Although FIG. 1 illustrates application server computer 116 and sensing systems 118 each as a single computer, the innovations or embodiments are not so limited. For example, one or more functions of application server computer 116, sensing systems 118, or the like, may be distributed across one or more distinct network computers. Moreover, in one or more embodiments, sensing systems 118 may be implemented using a plurality of network computers. Further, in one or more of the various embodiments, application server computer 116, sensing systems 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
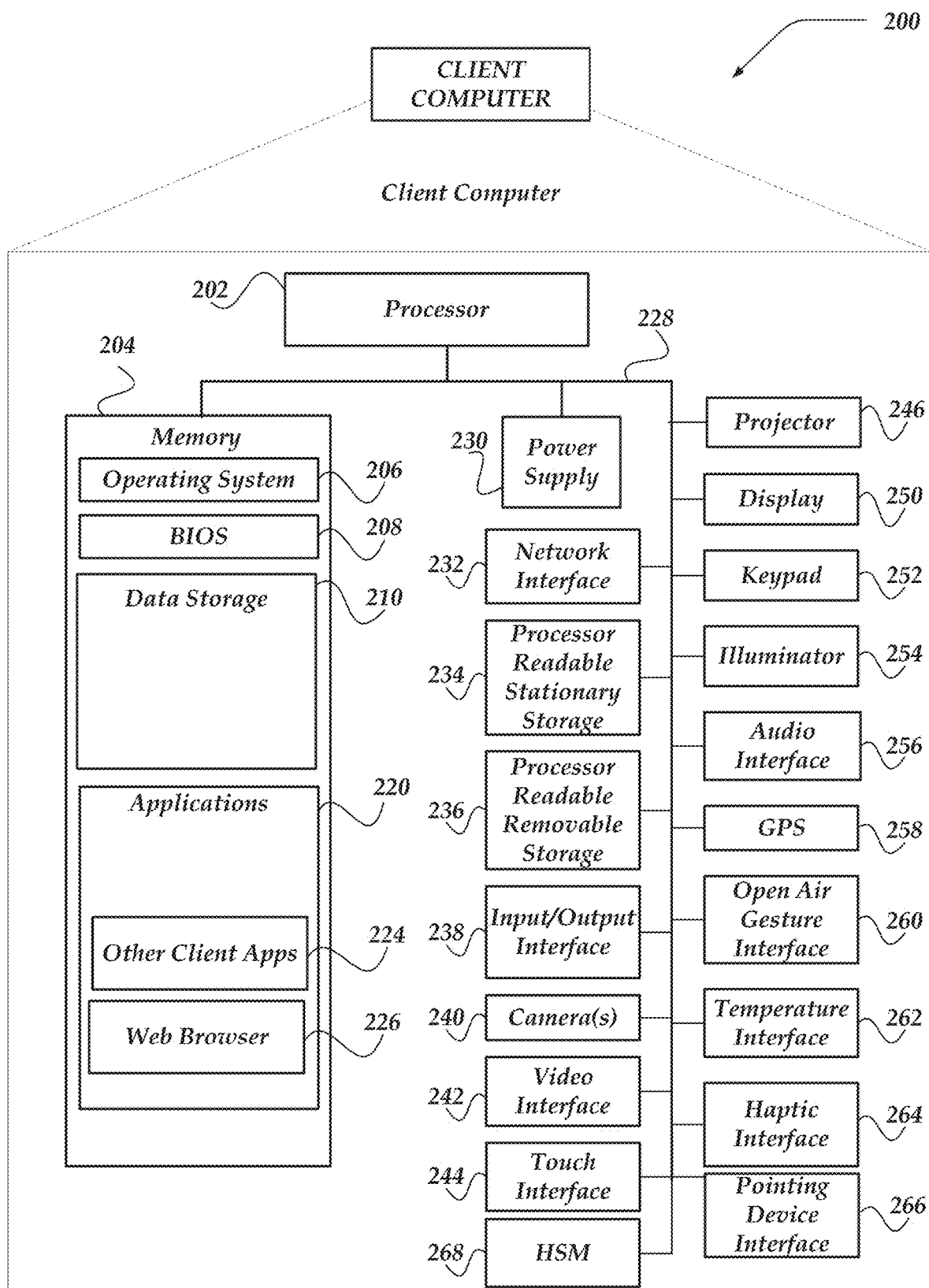
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
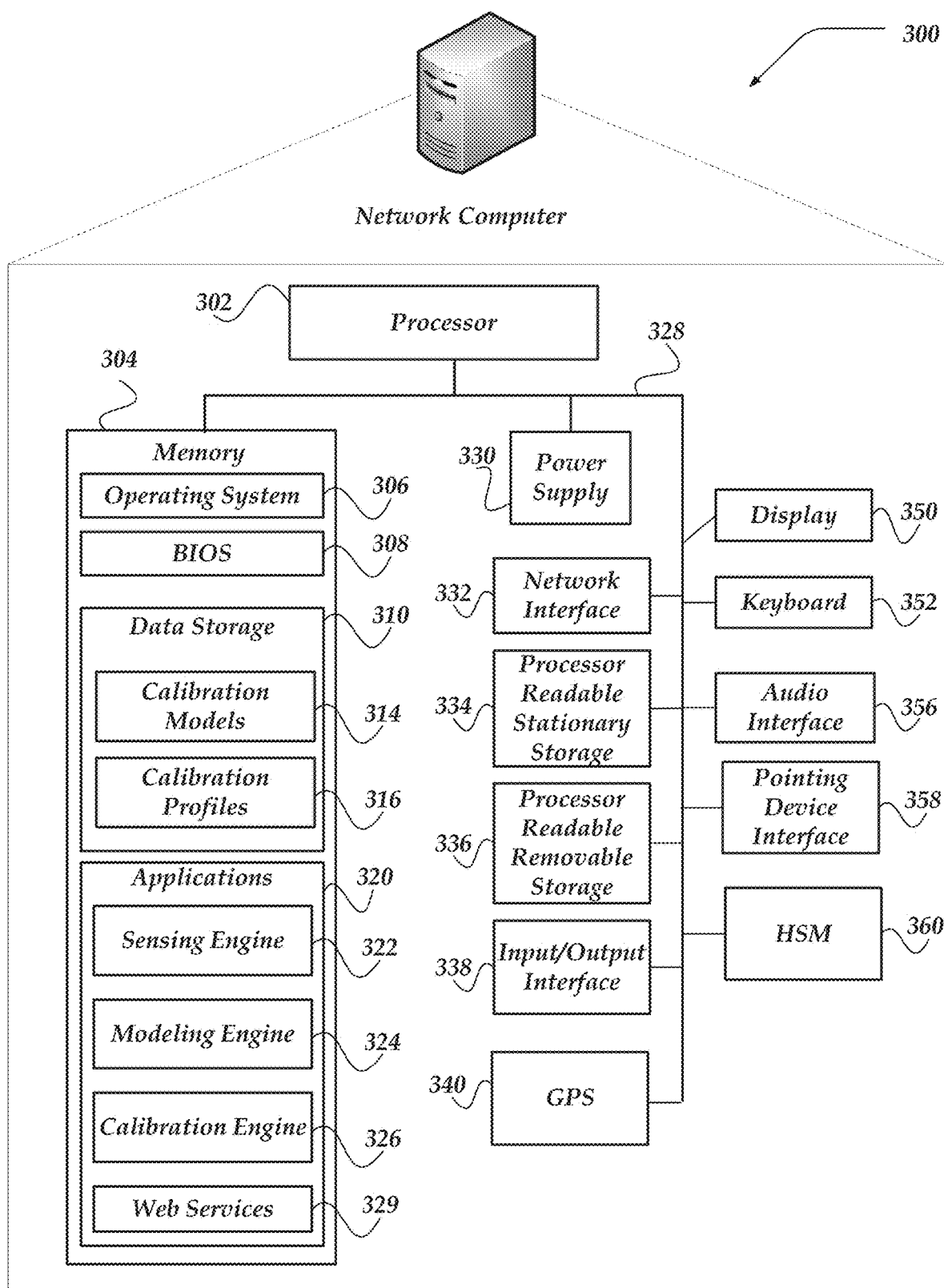
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or sensing systems 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as, USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, sensing engine 322, modeling engine 324, calibration engine 326, web services 329, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, calibration models 314, calibration profiles 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include sensing engine 322, modeling engine 324, calibration engine 326, web services 329, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 322, modeling engine 324, calibration engine 326, web services 329, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 322, modeling engine 324, calibration engine 326, web services 329, or the like, may be provisioned and de-commissioned automatically.

Also, in one or more of the various embodiments, sensing engine 322, modeling engine 324, calibration engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
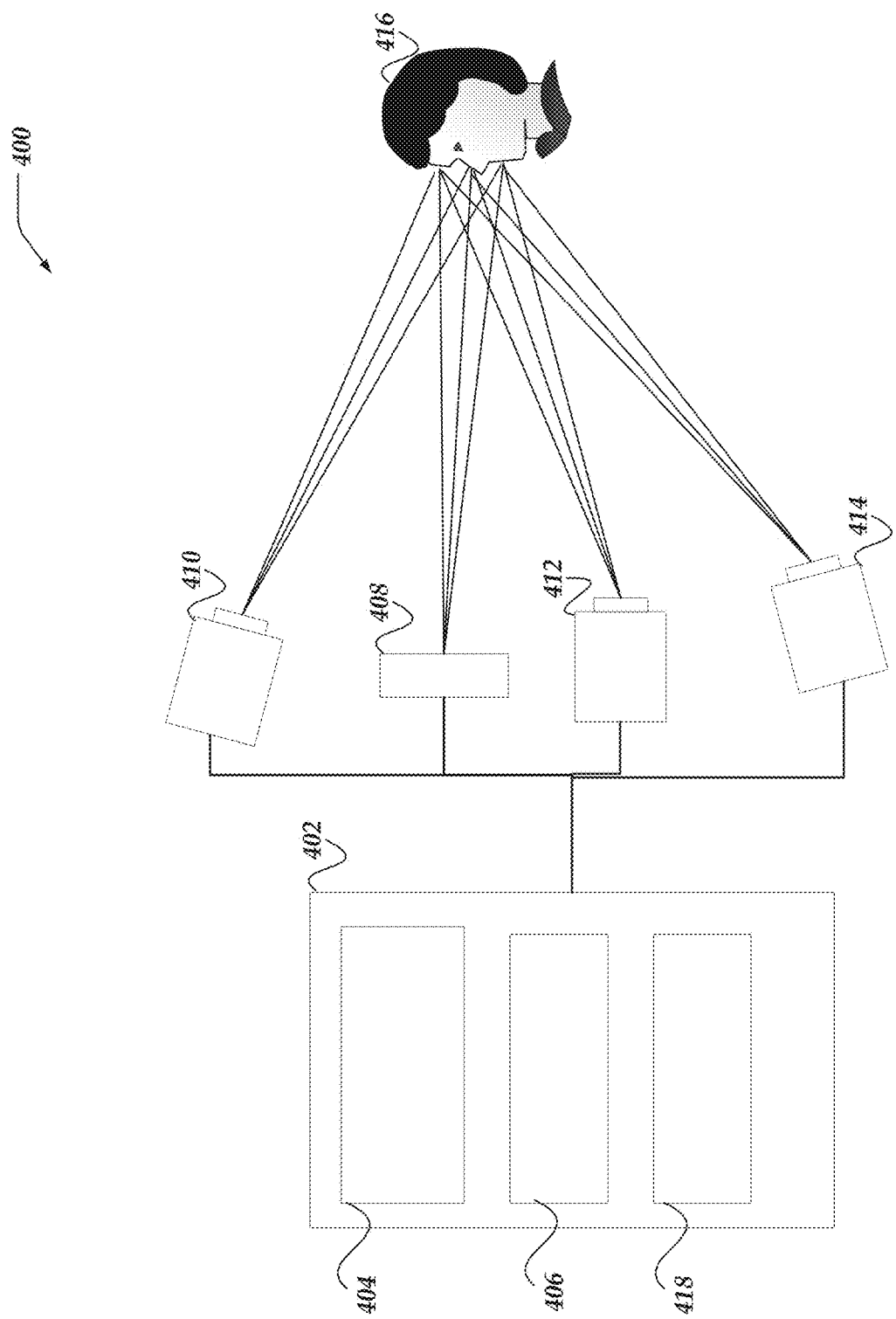
FIG. 4 illustrates a logical architecture of a system for calibration of 3D acquisition systems in accordance with one or more of the various embodiments.

FIG. 4 illustrates a logical architecture of system 400 for dynamic calibration of 3D acquisition systems in accordance with one or more of the various embodiments.

In this example, for some embodiments, sensing systems, such as system 400 may include one or more servers, such as sensing server 402. In some embodiments, sensing servers may be arranged to include: one or more sensing engines, such as, sensing engine 404; one or more modeling engines, such as, modeling engine 406; one or more calibration engines, such as, calibration engine 418.

Also, in some embodiments, sensing systems may include one or more signal generators that may at least generate sensor information based on where the energy from the signal generator reflects from a surface. In this example, for some embodiments, signal generator 408 may be considered to be a laser scanning system. Further, in some embodiments, sensing systems may include one or more sensors that may receive the reflected signal energy. In this example, for some embodiments, the sensors may be considered sensors that may be arranged to generate sensor information that corresponds to the reflected signal energy. In this example, sensors, such as, sensor 410, sensor 412, sensor 414 may be considered to be CCDs, scanning event cameras, or the like, that provide two-dimensional (2D) sensor information based on the CCD/pixel cells that detect the reflected signal energy.

Accordingly, in some embodiments, the 2D sensor information from each sensor may be provided to a sensing engine, such as, sensing engine 404. In some embodiments, sensing engines may be arranged to synthesize the 2D points provided by the sensors into 3D points based on triangulation, or the like.

Further, in some embodiments, sensing engines may be arranged to direct the signal generator (e.g., scanning laser 408) to follow a specific pattern based on one or more path-functions. Thus, in some embodiments, signal generators may scan the subject area using a known and precise path that may be defined or described using one or more function that correspond to the curve/path of the scanning.

Accordingly, in some embodiments, sensing engines may be arranged to synthesize information about the objects or surfaces scanned by the signal generate based on the 3D sensor information provided by the sensors and the known scanning curve pattern.

In some embodiments, scanning signal generator 408 may implemented using one or more fast laser scanning devices, such as a dual-axis MEMS mirror that scans a laser beam. In some embodiments, the wavelength of the laser may be in a broad range from the UV into the IR. In some embodiments, scanning signal generators may be designed to scan up to frequencies of 10s of kHz. In some embodiments, scanning signal generators may be controlled in a closed loop fashion using one or more processors that may provide feedback about the objects in the environment and instruct the scanning signal generator to adapt one or more of amplitude, frequency, phase, or the like. In some cases, for some embodiments, scanning signal generators may be arranged to periodically switch on and off, such as, at points if the scanner may be slowing before changing direction or reversing direction.

In some embodiments, system 400 may include two or more sensors, such as, sensor 410, sensor 412, sensor 414, or the like. In some embodiments, sensors may comprise arrays of pixels or cells that are responsive to reflected signal energy. In some embodiment, sensors may be arranged such that some or all of the sensors share a portion of their fields of view with one another and with the scanning signal generator. Further, in some embodiments, the relative position and poses of each sensor may be known. Also, in some embodiments, each sensor employs synchronized clock. For example, in some embodiments, sensors may be time synchronized by using a clock of one sensor as the master clock or by using an external source that periodically sends a synchronizing signal to the sensors. Alternatively, in some embodiments, sensors may be arranged to provide sensor events to sensing engines independently or asynchronously of each other. In some embodiments, scanning event cameras may be employed as sensors.

Accordingly, as a beam from the scanning signal generator beam scans across the scene, the sensors receive the reflected signal energy (e.g., photons/light from lasers) and trigger events in their cells/pixels based on detecting physical reflections in the scene. Accordingly, in some embodiments, each event (e.g., sensor event) in a sensor may be determined based on cell location and a timestamp based on where and when the reflected energy is detected in each sensor. Thus, in some embodiments, each sensor reports each sensor event independently as it is detected rather than collecting information/signal from the entire sensor array before providing the sensor event. This behavior may be considered distinguishable from many conventional pixel arrays or CCDs which may 'raster scan' the entire array of cells before outputting signal data. In contrast, sensors, such as, sensor 410, sensor 412, sensor 414, or the like, may immediately and continuously report signals (if any) from individual cells. Accordingly, the cells in an individual sensor do not share a collective exposure time rather each cell reports its own detection events. Accordingly, in some embodiments, sensors, such as, sensor 410, sensor 412, sensor 414, or the like, may be based on event sensor cameras, single photon avalanche diode (SPAD) sensors, silicon photo-multipliers (SiPM) arrays, or the like.

Figure 5:
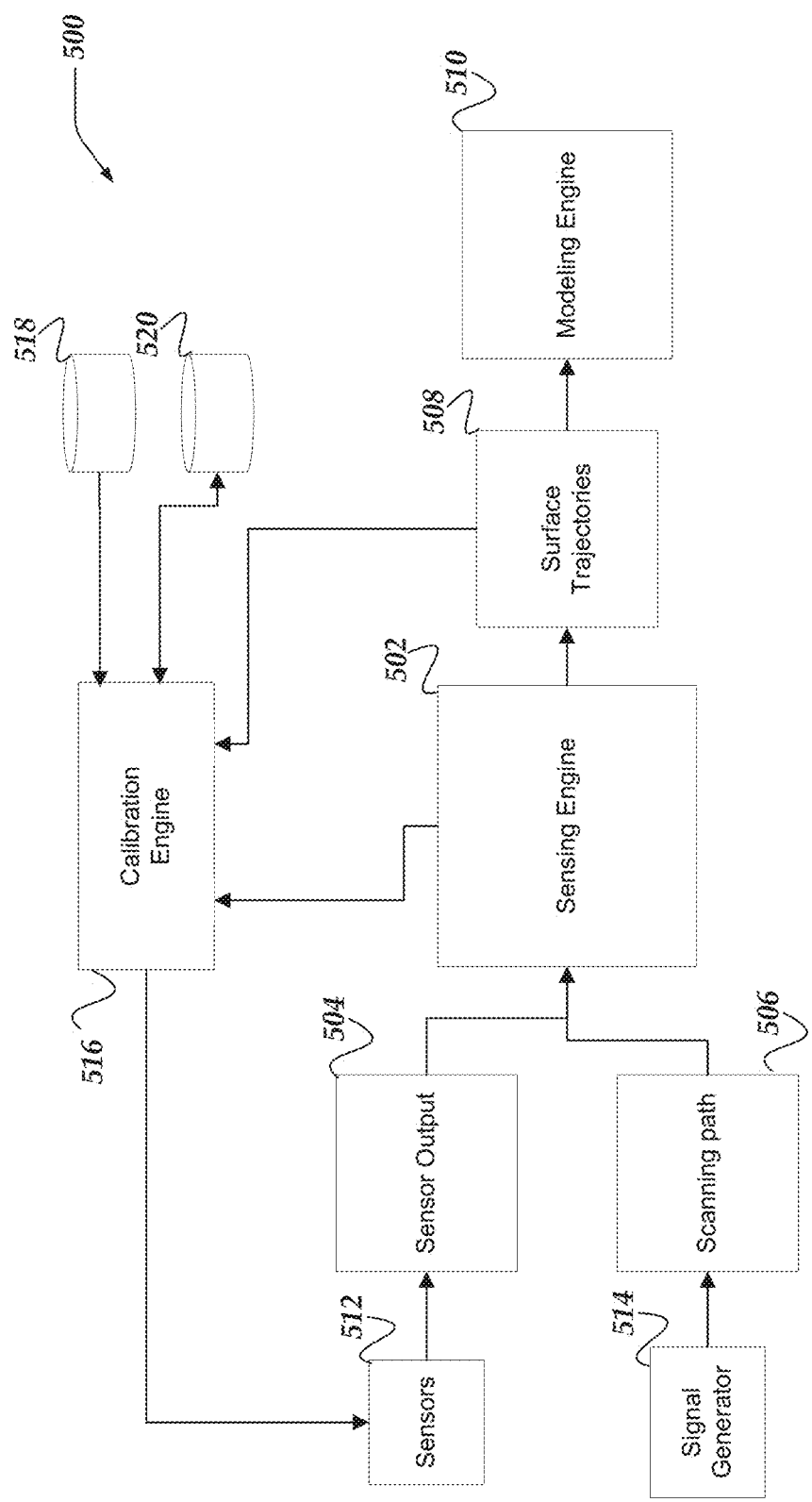
FIG. 5 illustrates a logical schematic of a system for calibration of 3D acquisition systems in accordance with one or more of the various embodiments.

FIG. 5 illustrates a logical schematic of system 500 for dynamic calibration of 3D acquisition systems in accordance with one or more of the various embodiments. In some embodiments, sensing engines, such as, sensing engine 502 may be arranged to be provided sensor outputs that represent sensor information, such as, location, pixel location, timing, or the like, that may be associated with sensor events. As described above, in some embodiments, signal generators, such as, scanning lasers may scan an area of interest such that reflections of the energy may be collected by sensors. Accordingly, in some embodiments, information from each sensor may be provided to sensing engine 502.

Also, in some embodiments, sensing engine 502 may be provided a scanning path that corresponds the scanning path of the scanning signal generator. Accordingly, in some embodiments, sensing engine 502 may employ the scanning path to determine the path that the scanning signal generator traverses to scan the area of interest.

Accordingly, in some embodiments, sensing engine 502 may be arranged to recognize sensor events that may correspond to a surface location in three-dimensions based on the sensor output. For example, if there may be three sensors, the sensing engine may employ triangulation to compute the location in the area of interest where the scanning signal energy was reflected. One of ordinary skill in the art will appreciate that triangulation or other similar techniques may be applied to determine the scanned location if the position of the sensors is known.

In some embodiments, scanning signal generators (e.g., fast scanning lasers) may be configured to execute a precision scanning pattern. Accordingly, in some embodiments, sensing engine 502 may be provided the particular scanning path function. Also, in some embodiments, sensing engine 502 may be arranged to determine the particular scanning path based on configuration information to account for local circumstances of local requirements.

In one or more of the various embodiments, sensing engines, such as, sensing engine 502 may generate a sequence of surface trajectories that may be based the scan path and the sensor information synthesized from the sensor output 504.

Further, in some embodiments, sensors may require initial periodic calibration that accounts for the relative positions of the sensors, signal generator, or the like. For, example, among other thing, precise position determination may be required to compute calibration offset values to improve triangulation or other activities of a sensing system. Accordingly, in some embodiments, system 500 may include a calibration engine, such as, calibration engine 516 that may initiate or perform one or more actions to automatically calibrate or adjust one or more parameters associated with sensors 512 or the sensing system as a whole. In some embodiments, calibration engines may employ one or more calibration models to determine one or more actions for calibrating sensors or evaluating calibration information. In some embodiments, calibration models may be data instructions that declare or include one or more instructions, rules, machine-learning based classifiers, decision trees, or the like. In this example, calibration models may be considered to stored in calibration model data store 518. In some embodiments, calibration engines may be arranged to obtain calibration models from such data stores. Also, in some embodiments, calibration engines may be arranged to employ one or more calibration models based on rules, instructions, libraries, plug-ins, extensions, or the like, that may be provided via configuration information to account for local circumstances or local requirements.

Also, in some embodiments, one or more calibration parameter values may be stored in calibration profiles. In some embodiments, calibration profiles may be data structures that may be employed to record a set of calibration parameter values, including position information, for sensors. In some embodiments, sensors may be employed in a variety of different operating environments that may require different calibration values. Likewise, in some embodiments, sensors may have different characteristics depending on the make, model, version, or the like. In some cases, for some embodiments, individual sensors of the same type (e.g., make, model, version, or the like) may have performance characteristics that vary within a known range or values that fall within known manufacturer tolerances. Accordingly, in some case, manufacturer tolerances may be insufficient for some accurate/precise sensing applications. Accordingly, in some embodiments, calibration engines may be arranged to generate calibration profiles that represent one or more characteristics, including positional information, of individual sensors. Accordingly, in some embodiments, calibration profile data store 320 may be employed to store a plurality of calibration profiles determined by dynamic calibration of 3D acquisition systems.

In one or more of the various embodiments, calibration engines may be arranged to determine a calibration model and an initial calibration profile for calibrating a particular sensor. In some embodiments, calibration engines may be arranged to execute one or more actions declared by the calibration model to set calibration parameters, measure performance features of the sensors, or the like.

In some embodiments, calibration engines may be arranged to automatically determine one or more parameter values for one or more calibration parameters based on the calibration model. In some embodiments, calibration engines may be arranged to store the determined parameter values in a calibration profile for each calibrated sensor. In some cases, for some embodiments, a same sensor may be associated with more than one calibration profiles each directed to different applications, operating environments, performance requirements, or the like.

Figure 6:
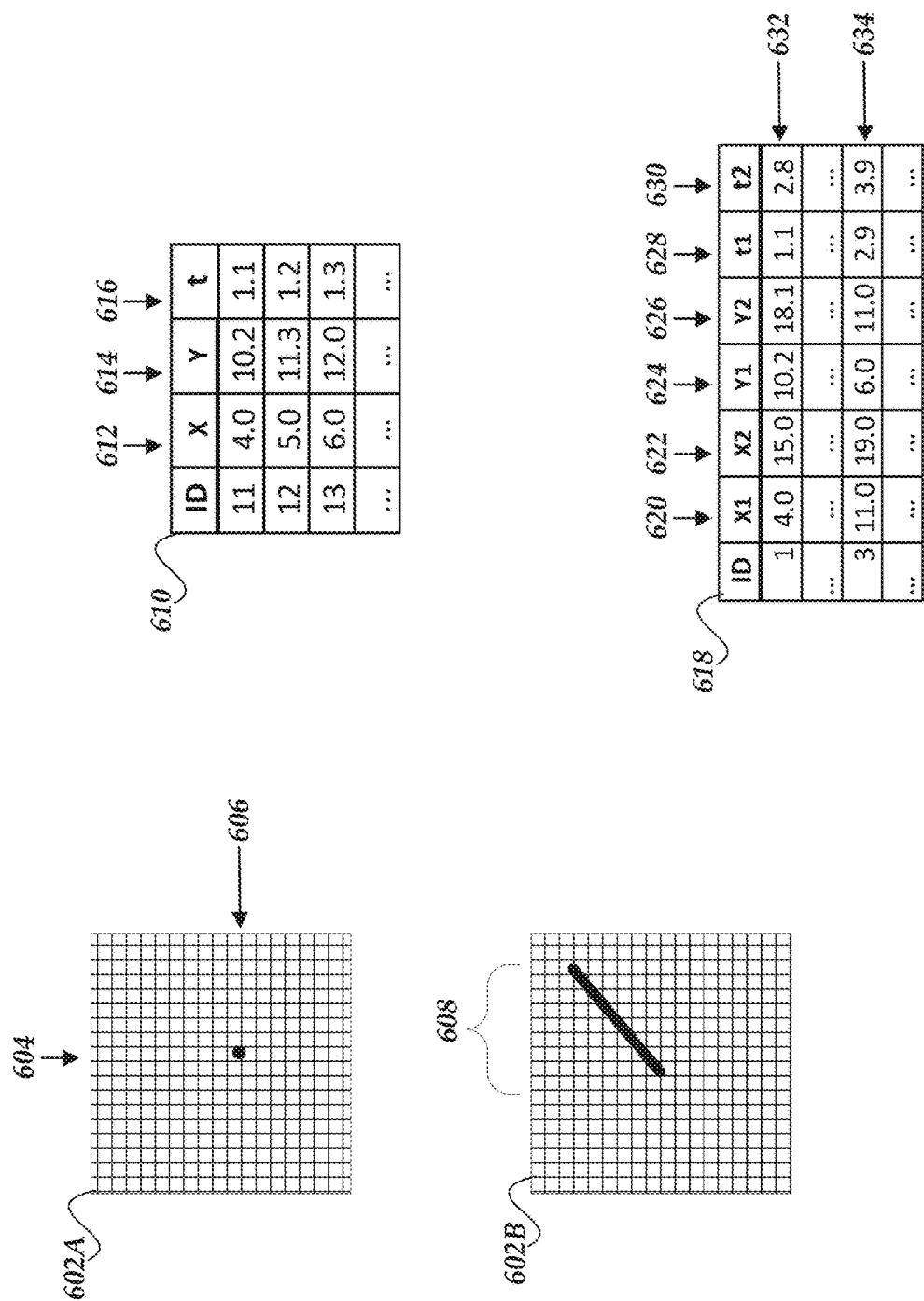
FIG. 6 illustrates a logical representation of sensors and sensor output information for calibration of 3D acquisition systems in accordance with one or more of the various embodiments.

FIG. 6 illustrates a logical representation of sensors and sensor output information for dynamic calibration of 3D acquisition systems in accordance with one or more of the various embodiments.

In one or more of the various embodiments, sensing engines may be provided sensor output from various sensors. In this example, for some embodiments, sensor 602A may be considered to represent a generic sensor that may emit signals that correspond to the precise location on the sensor where reflected energy from the scanning signal generator may be detected. For example, sensor 602A may be considered an array of detector cells that reports the cell location of the cell that has detected energy reflected from the scanning signal generator. In this example, horizontal location 604 and vertical location 606 may be considered to represent a location corresponding to the location in sensor 602 where reflected signal energy has been detected.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employs triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a precise path/curve (e.g., scanning path). Accordingly, in some embodiments, the pattern or sequence of cells in the sensors that detect reflected energy will follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 608 may represent a sequence of cells in sensor 602B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using a various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to when the detection event occurred.

In this example, for some embodiments, data structure 610 may be considered a data structure for representing sensor events based on sensor output provided to a sensing engine. In this example, column 612 represents the horizontal position of the location in the scanning environment, column 614 represent a vertical position in the scanning environment, and column 616 represents the time of the event. Accordingly, in some embodiments, sensing engines may be arranged to determine which (if any) sensor events should be associated with a trajectory. In some embodiments, sensing engines may be arranged to associated sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor event as noise if their location deviates from a predicted path beyond a defined threshold value.

In one or more of the various embodiments, sensing engines may be arranged to determine sensor events for each individual sensor rather being limited to provide sensor events computed based on outputs from multiple sensors. For example, in some embodiments, sensing engines may be arranged to provide a data structure similar to data structure 610 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 618 to represent a trajectory that are determined based on the information captured by the sensors. In this example, data structure 610 may be table-like structure that includes columns, such as, column 620 for storing a first x-position, column 622 for storing a second x-position, column 624 for storing a first y-position, column 626 for storing a second y-position, column 628 for storing the beginning time of a trajectory, column 630 for storing an end time of a trajectory, of the like.

In this example, row 632 represents information for a first trajectory and row 634 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not one cell wide because in some cases reflected energy may splash to neighboring cells or land on the border of two or more cells. Accordingly, in some embodiments, to better estimate the real position of the reflected signal beam as it traverses the sensor plane, sensing engines may be arranged to perform an online smoothing estimate, e.g., using a smoothing Kalman filter to predict where the scanning beam point should have been in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to when the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 618 for each sensor.

Figure 7:
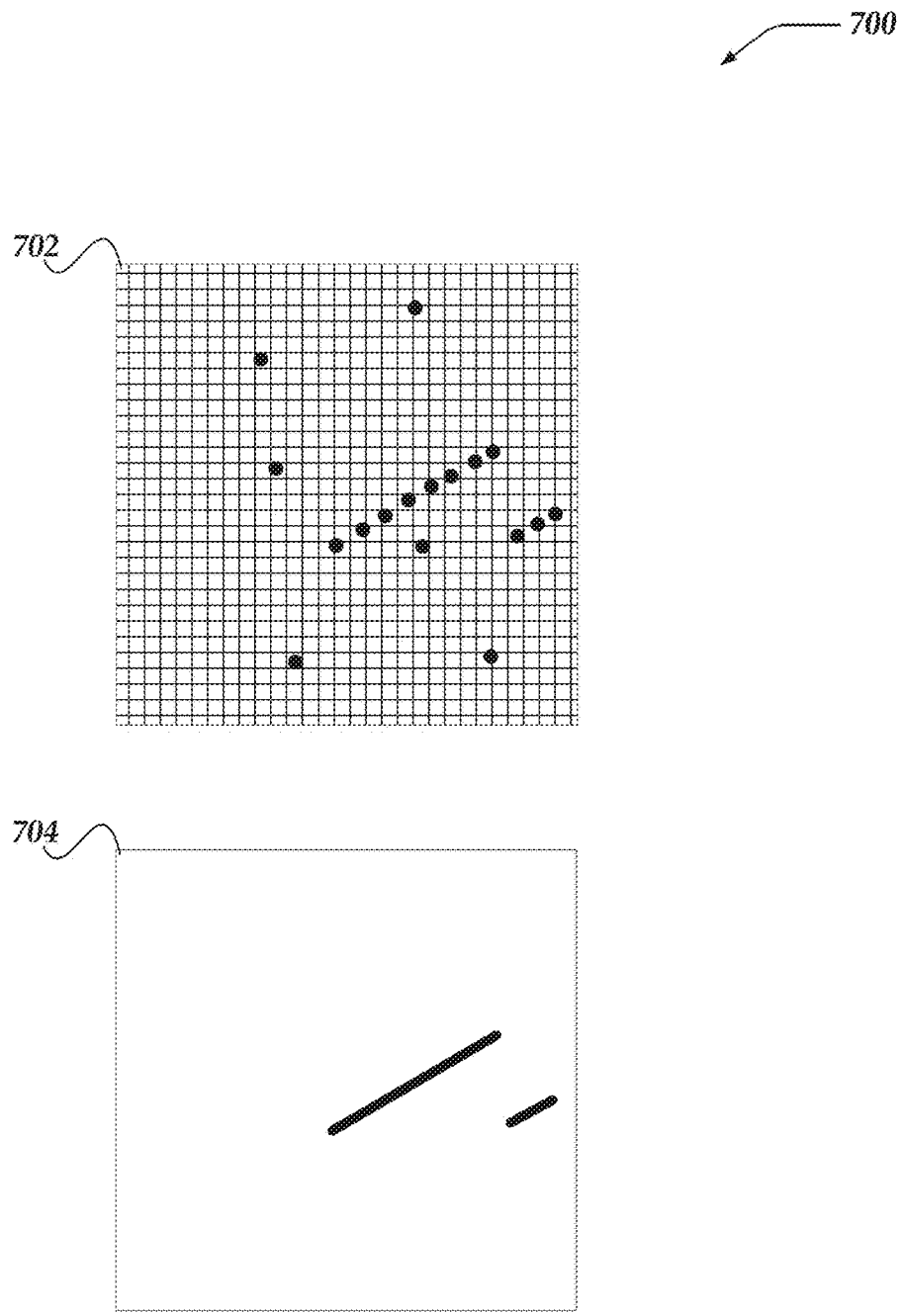
FIG. 7 illustrates a logical schematic of a system for calibration of 3D acquisition systems in accordance with one or more of the various embodiments.

FIG. 7 illustrates a logical schematic of system 700 for dynamic calibration of 3D acquisition systems in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 702 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 704.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines may be arranged to employ rules, instructions, heuristics, or the like, for classifying sensor events as noise that may be provided via configuration information to account for local requirements or local circumstances that may be associated with a sensing applications or sensors.

Figure 8A:
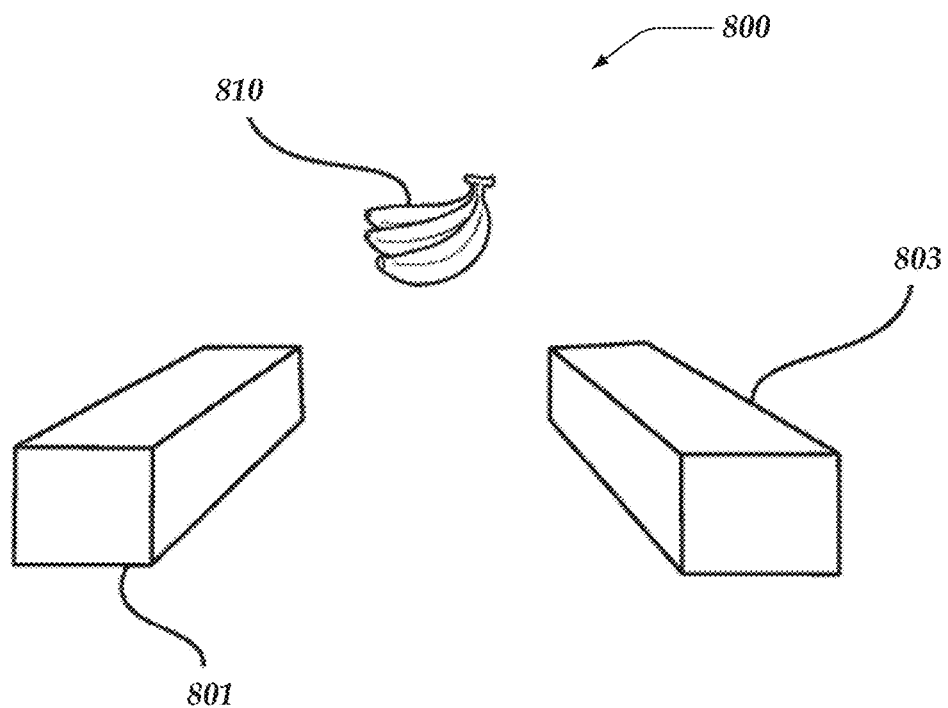
FIG. 8A shows a sensing system in accordance with one or more of the various embodiments.

FIG. 8A shows sensing system 800 in accordance with one or more of the various embodiments. In some embodiments, two sensors 801 and 803 may be configured to focus on a scene and may be measuring the shape and movement of an object 810. Reasonable qualitative and quantitative measurements of object 810 may require accurate knowledge of the relative positions of the sensors 801 and 803. For instance, in this system, sensor 803 may be considered to have six degrees of freedom (DOF) from sensor 801, comprising three translational and three rotational DOFs. Accordingly, in some embodiments, the second sensor may be displaced from the first sensor and may be rotated in any of three axes. Commonly the DOFs are described with respect to reference frames assigned to each component in the system.

Figure 8B:
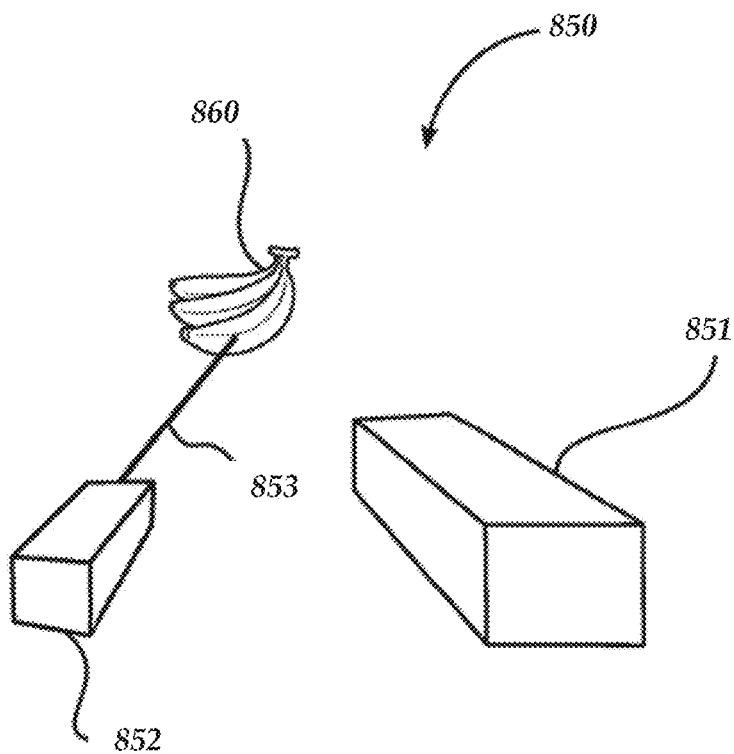
FIG. 8B shows a scanning signal generator triangulation 3D capture system in accordance with one or more of the various embodiments.

FIG. 8B shows a scanning signal generator triangulation 3D capture system 850 in accordance with one or more of the various embodiments. In this example, sensor 851 observes a scene and may be measuring the shape and movement of an object 860. An illumination system 852 illuminates the object, and the sensor may use this data to calculate depth information of the object. In this example, the illumination system 852 may scan the object 860 sequentially with a signal generator beam 853, or may illuminate the object 860 with a structured signal pattern. In this example, precise knowledge of alignment between sensor 851 and illumination system 852 may be required, particularly the 6 DOFs between the sensor and illumination frames. In both systems 800 as well as 850, one or more special calibration setups including customized targets are often used to properly align and quantify the systems before 3D measurements may be taken. Also, in some embodiments, other systems may be used that include more illumination systems or additional sensors that increase the number of DOFs of the system. Also, in some embodiments, triangulation systems with additional sensors may be extremely sensitive to movement of various DOFs of the system.

In some embodiments, sensing systems may also require elaborate rigging of lighting and sensor objects to ensure rigidity of angles and positions. Even small changes in angles or positions of some elements in a system may measurably affect the accuracy of the results. 3D sensing using triangulation may be particularly sensitive to these changes. Changes in mounting greater than a certain tolerance may necessitate full recalibration of the 3D capture system, which may be very often a slow process. In conventional systems, recalibration cannot usually be accomplished where the system may be installed as they require precise calibration targets in known locations, leading to considerable downtime.

In addition, some conventional 3D capture systems may be sensitive to temporary changes in orientation of their components, such as those due to vibration or other movements of their rigid structures. These temporary movements may also cause accuracy errors in the final measurements. Accordingly, in some cases, calibration that may be performed quickly enough to account for either of these types of movements may be advantageous.

Figure 9A:
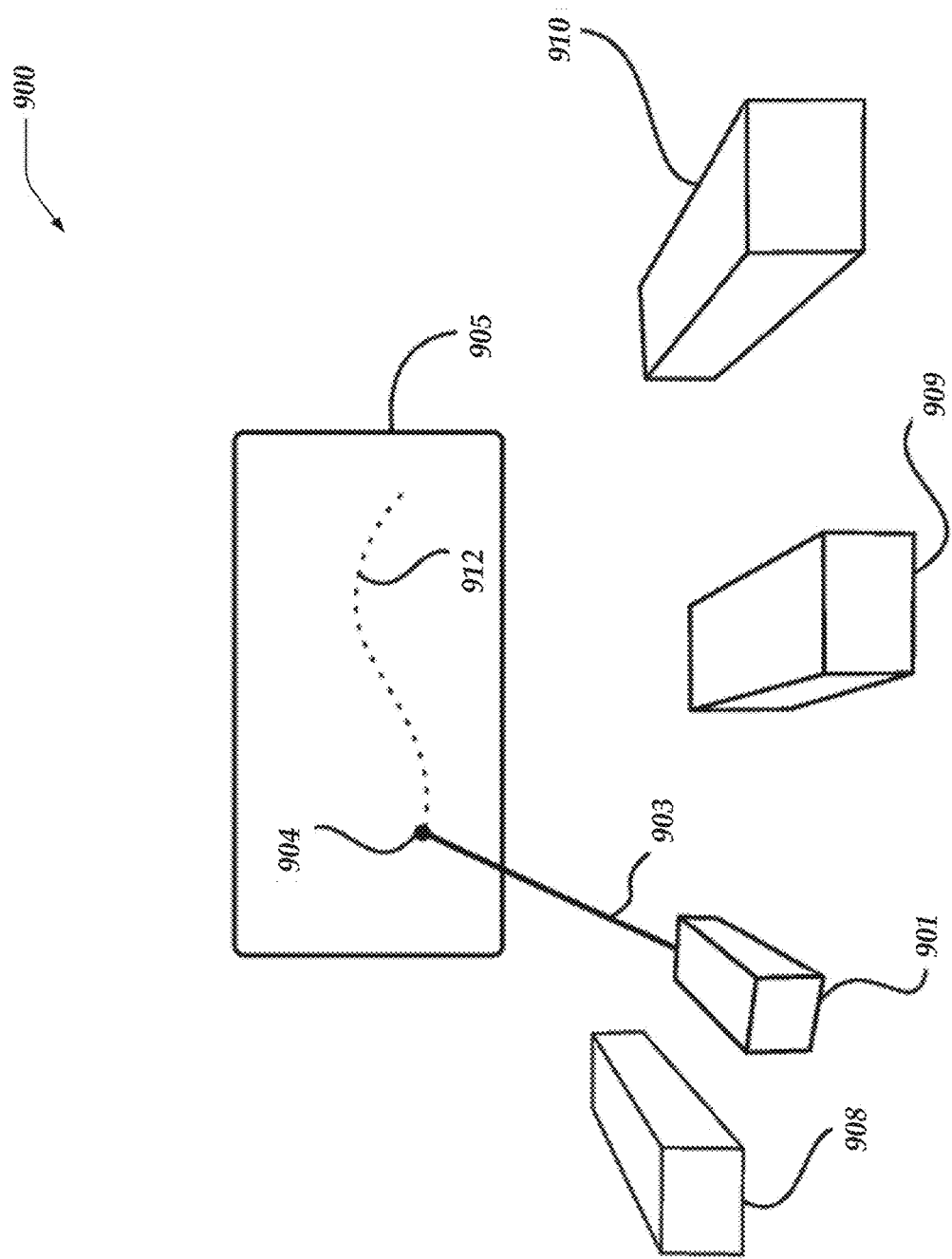
FIG. 9A shows a scanning signal generator triangulation 3D capture system in accordance with one or more of the various embodiments.

FIG. 9A is an embodiment of a system 900 used for 3D acquisition of objects comprising at least two sensors in accordance with one or more of the various embodiments, though three or more sensors may be used. In some embodiments, objects to be measured may be considered to be stationary relative to the system 900. Also, in some embodiments the objects may be in motion. In an example, a flat surface 905 may be scanned by signal generator 901 (e.g., a scanning laser) emitting beam 903 which scans spot 904 across the surface of object 905. In this example, sensors 908, 909, and 910 may be considered to have partially overlapping fields of view (FOV) that may be configured to capture details about the scene, and may be generally placed at various locations and rotations so to capture the scene from multiple perspectives. Initial calibration of system 900 may involve one or more measurements to ascertain precise rotation and translation displacements of sensors 909 and 910 with respect to the reference frame of sensor 908. Although in this example sensor 908 may be chosen to be the reference sensor, any sensor in a sensing system may be chosen to be a reference if relative positions and rotations among the various sensors which define the system DOFs may be determined or provided. Also, in this example, a flat surface may be shown as object 905, however non-flat objects may be used for this purpose.

In this example, for some embodiments, sensors 908, 909, and 910 may be considered event sensors, where each pixel in an event sensor may independently report changes in light level at the pixel level. Events reported by such a sensor may be reported in the form (x, y, t), where x and y may be the positions of the event on the event sensor sensor array, and t is the timestamp of the event. The resolution of the sensor in time may be constrained by the speed at which the sensor may report events in the sensor globally as well as effects including time jitter, event timestamp arbiter circuitry, and others. Event sensors often have resolution of each event down to 1 μs, but may be able to report events even faster as the technology improves.

In one or more of the various embodiments, scanning signal generator systems, such as, lasers, may be particularly good at triggering events at the sensor, since their relatively bright signal reflections may be very distinguishable from background light and other noise. In a sufficiently fast system, the signal generator 901 may be scanned quickly enough so that data from moving objects may also be used to calibrate system DOFs.

In some embodiments, setup of the sensors and other system parameters may be chosen such that events as captured on each sensor may be connected into smooth, connected paths as a signal generator traces its spot 904 across the surface of a relatively continuous surface. One example of such a path may be path 912. Paths may be relatively long or short, depending upon object size being scanned relative to each sensor's field of view. Although path 912 may be depicted as a dotted line, this represents the traced path of the signal generator spot as it moves across the objects, and would then be detected as many events over time from neighboring or near pixels in each event sensor's sensor array. For 3D information to be obtained, complete paths such as path 912 may be captured by one or more event sensors in their entirety.

In one variant embodiment, standard frame capture sensors may be used instead of event sensors, though very fast sensors should be chosen to achieve more accurate calibration data; methods as described herein for calibrating system DOFs rely on object and point data that may be taken either simultaneously or else quickly compared to either movement of objects or movement of the system itself. In this variant, either lines may be measured directly on an object that may be fit to create artificial fiducials from the object, or else the sensors could still image paths from beams as scanned across the surface of the object, and calculate points that may be relatively time-insensitive.

In some embodiments, calibration engines, sensing engines, or modeling engines may be arranged to map or fit event sequences into trajectories that correspond to a curve that may be fit to scanned paths.

Figure 9B:
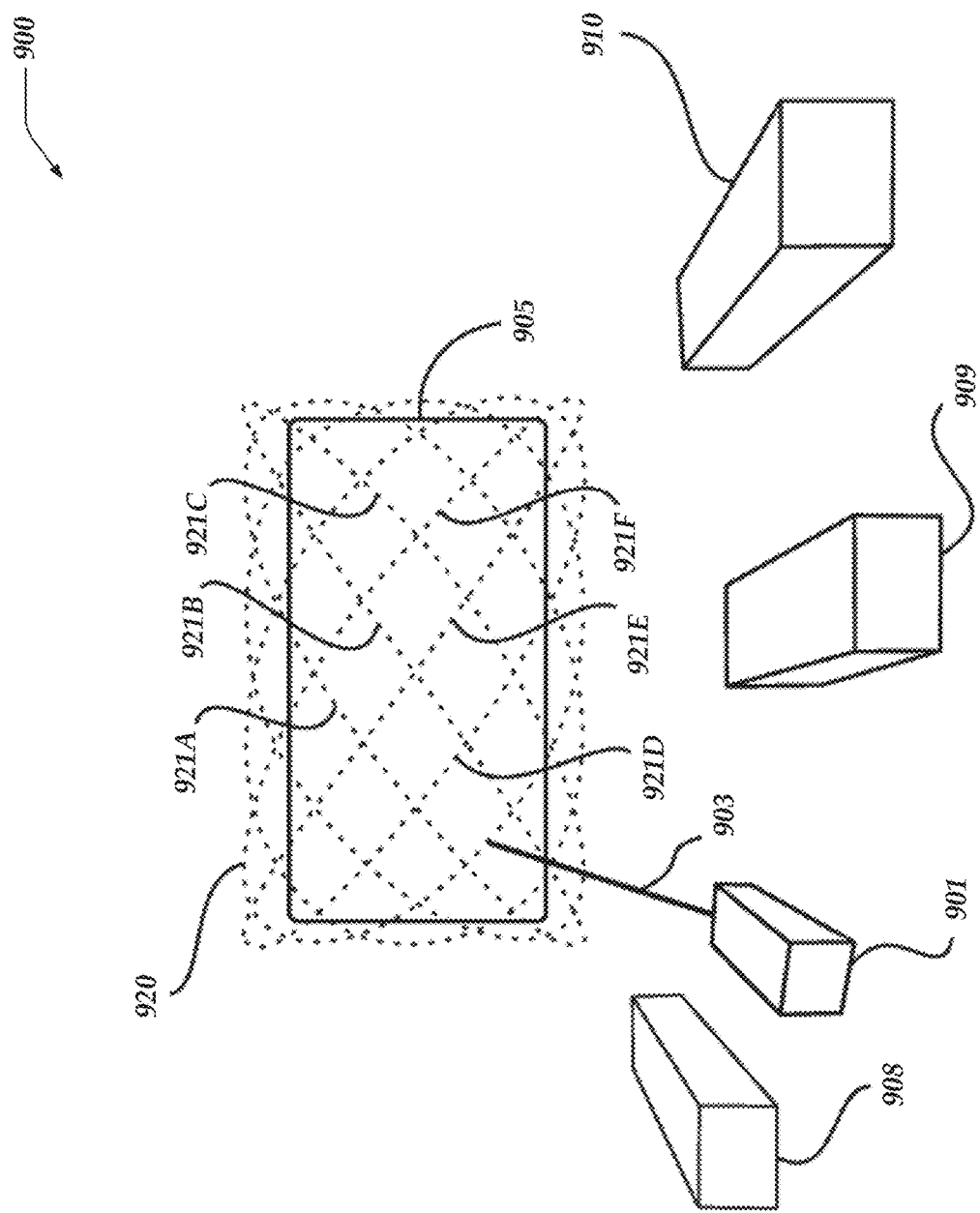
FIG. 9B shows a system being used to perform a method of calibration of the system in accordance with one or more of the various embodiments.

FIG. 9B shows system 900 being used to perform a method of calibration of the system in accordance with one or more of the various embodiments. In some embodiments, scanning signal generator 901 may be scanning with a single beam 903 which may be tracing out pattern 920 over object 905. In an example, scanned pattern 920 may be a Lissajous pattern set to be larger than object 905 being scanned. In many cases, the scanning pattern may be larger, covering an area larger than the fields of views of each of event sensors 908, 909, and 910. Although only three sensors may be shown in this example, the method as described also works with two, four, or more sensors imaging the same scene. Lissajous pattern 920, as shown here illustratively, may be a closed pattern that repeats itself as the ratio of scanning speeds in the x and y directions may be a rational number. Open Lissajous patterns where the ratio of scanning speeds in the x and y directions may be an irrational number, may be used as well, and may provide more even coverage over the object over time with enough scans. Many other shapes of scanning a beam across an object may be possible and would be suitable for this method as long as the beam or beams cross on the object a sufficient number of times, whether a beam crosses itself or another beam. Other scanning shapes might include straight lines, curves, with patterned or random directions. Accordingly, in some embodiments, sensing systems may be arranged to determine scanning paths, or other initial conditions based on rules, instructions, settings, or the like, provided via configuration information to account for local requirements or local circumstances.

For accurate calibration in a system with three sensors, In some embodiments, four or more fiducial points (in 3D space) may be chosen to accurately calibrate a system with three sensors. In some embodiments, the exact position need not be known ahead of time. Since repeatably scannable fiducial points may be not guaranteed to be detectable or even present calibration engines may be arranged to determine artificial fiducial points on the surface of an object; the crossing points of the various paths created by the signal beam may be used for this purpose.

In some embodiments, artificial fiducial points may be not locked to a single position on the object's surface; thus subsequent calibrations may employ additional/new crossing points at different portions of the surface. In this example, pattern 920 illustrates a way that a beam may be moved over time across the surface. For illustration, the entire pattern may be shown, however the sensors observing the scene would not generally detect the portions of the pattern that do not intersect with an object within each of their fields of view. Further, in this example, each continuous portion of pattern 920 may be considered to form a path on the surface of the object. Representative paths are labeled 921A-F. Though this example shows a single object with multiple paths crossing it, in some embodiments, this may be not a requirement. For example, in some embodiments, calibration engines may be arranged to determine one or more artificial fiducial points based on patterns over the surface of two or more objects, and these crossing points may then used for calibration.

Figure 9C:
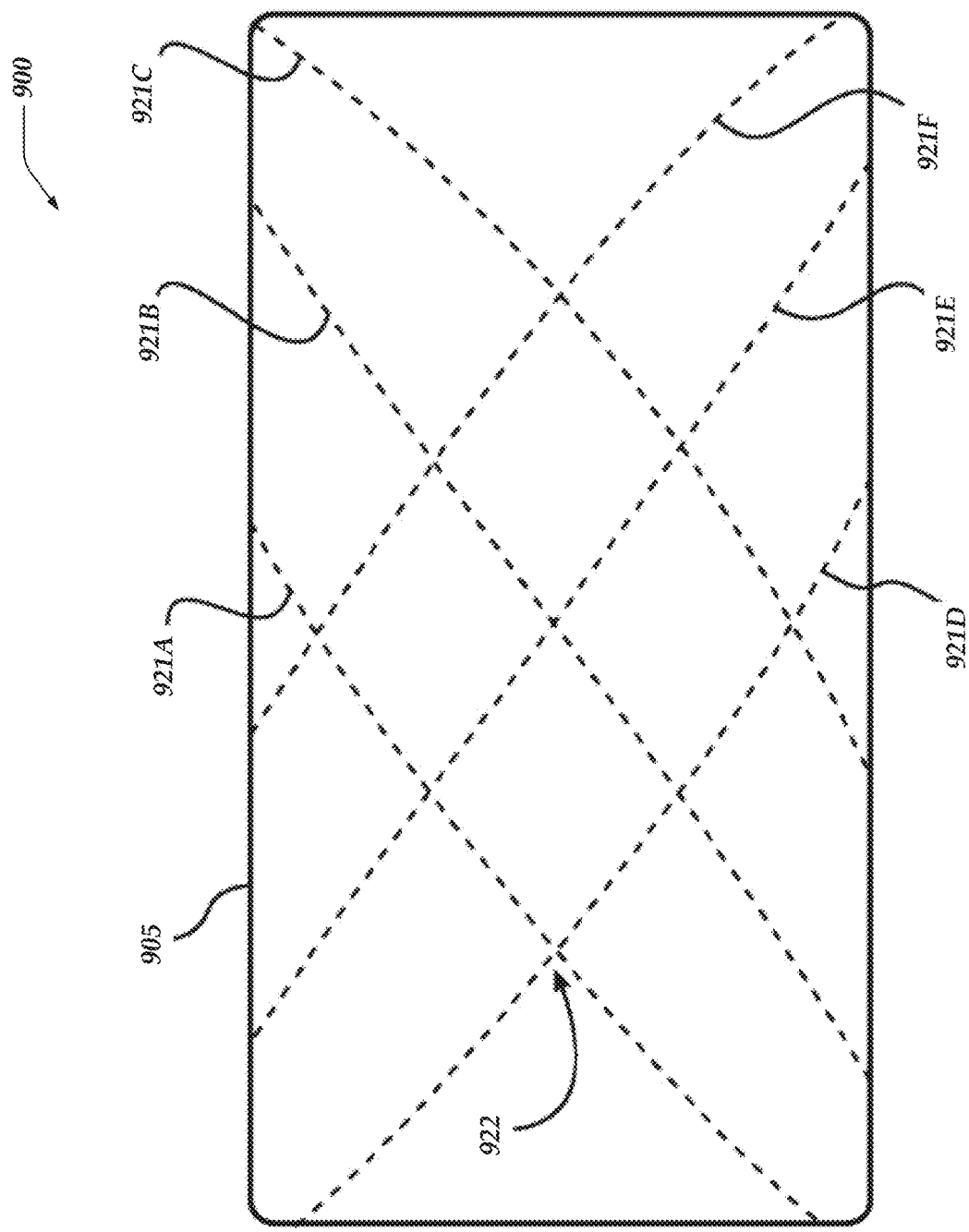
FIG. 9C shows a view of various signal beam paths on the surface of an object in accordance with one or more of the various embodiments.

FIG. 9C may be a close-up view of object 905 displaying paths 921A, 921B, 921C, 921D, 921E, and 921F, which comprise a subset of the paths on the surface of object 905 in accordance with one or more of the various embodiments. A continuous portion of the path may be defined relative to parameters set on each event sensor 908, 909, and 910; although continuous paths may be defined in many ways, one way may be that neighboring or near events on a contiguous path as detected by an event sensor may be less than an arbitrary distance away from the preceding event on the path both spatially as well as in time, and generally may be produced by tracing a path on an object over a surface without significant discontinuities. In some embodiments, sensing systems may be arranged to employ rules, instructions, or the like, for determining trajectories or paths from events that may be provided via configuration information to account for local requirements or local circumstances.

In this example, crossing point 922 may be representative of many crossing points that may occur during the scanning of an object, and may be a point used as an artificial fiducial point. Though not all crossing points in FIG. 9C may be labeled as such, crossing points may be referred to by the paths which cross. For instance, point 922 may also be named crossing point 921AD, as this may be the crossing point of the paths 921A and 921D. Other crossing points may be referred to in a similar manner. For clarity, paths 921A-F as shown may be representative of the path of the signal generator beam as it intersects the surface of object 905. Accordingly, events as measured on sensors 908, 909, and 910 may measure this path, but may be detected as tilted or skewed differently, since the paths as seen on each sensor may be from the perspective of the sensor in its position.

Figure 9D:
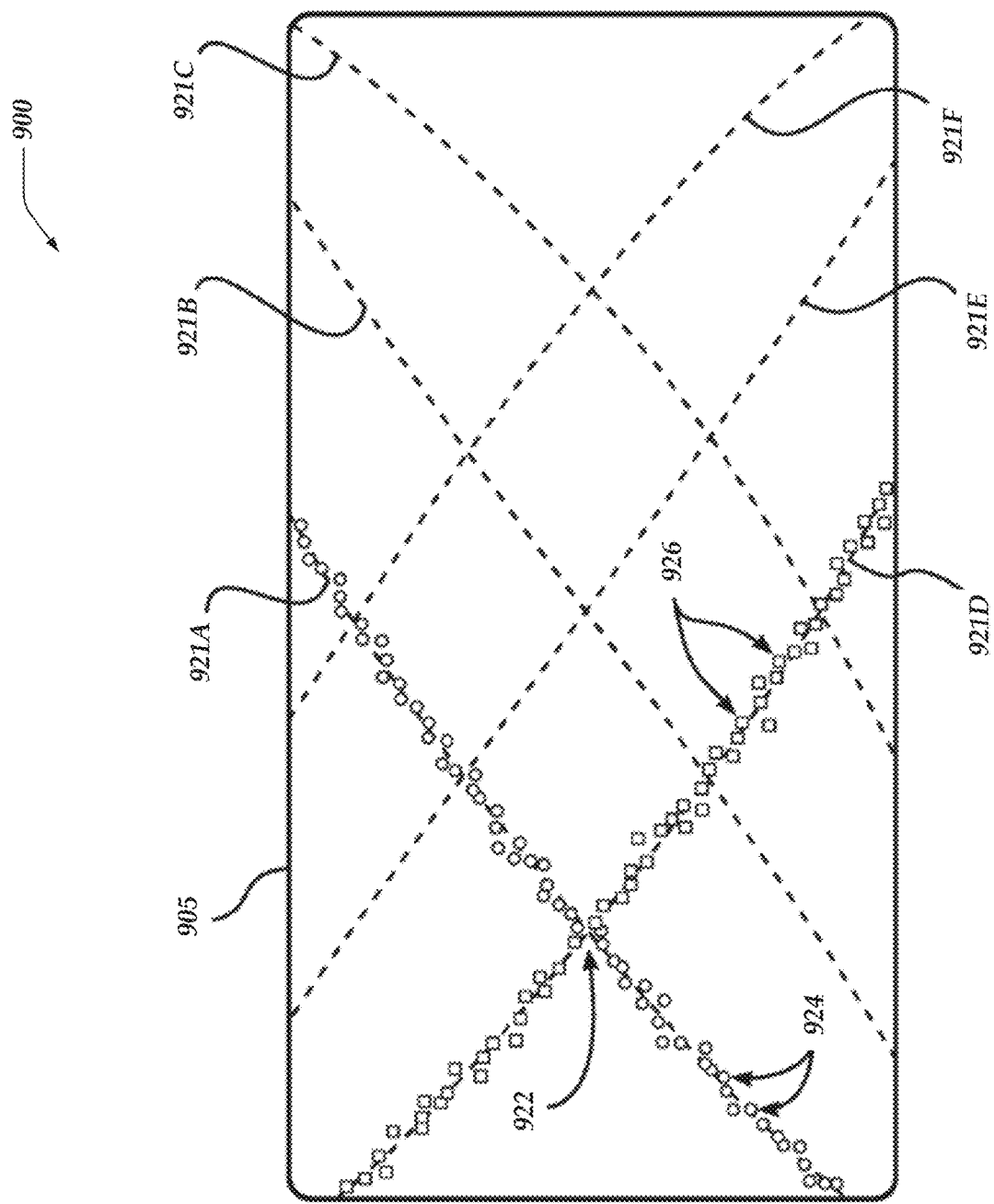
FIG. 9D shows an example of event pixels on paths in accordance with one or more of the various embodiments.

One example of event pixels may be shown in FIG. 9D, which overlays event pixels on paths from FIG. 9C. Accordingly, an event sensor sensor array may be typically a rectangular grid with certain x and y dimensions. Events may be triggered when the light level at a pixel changes sufficiently according to parameters set on the sensor. One example of events as triggered may be points 924, represented as circles, and points 926, represented as squares. A continuous path such as 921A over a flat or smoothly changing surface will also be smooth as the signal generator scans across it. Events 924 that may be triggered as the signal generator follows path 921A may normally not be as smooth. The sensor array may be a rectangular sensor with a certain pixel spacing. As the signal generator moves across the surface and reflects or scatters toward the sensors, events that may be triggered on the sensor array may be affected by a wide variety of factors, including beam size, beam power, beam scanning speed, sensor sensitivity settings, sensor time resolution, and others. In some embodiments, calibration profiles may be associated with the one or more sensors to configure one or more calibration parameters that may be associated with each sensor.

Event pixels as triggered may not show up exactly on the path as traced, nor will they trigger at exactly the same time the signal generator spot moves over the point a particular pixel may be imaging. Correspondingly, events 926 may be triggered as the signal generator follows path 921D. As the signal generator traces out the other paths on the figure, similar events may be triggered. Note that in this example, events may be shown as seen by one of the sensors; each of the other sensors may have their own set of independent events. Events 924 and 926 may be similar to events as seen on sensor 908; sensors 909 and 910 would see the same path of the signal generator spot at the same time, but events on these sensors would trigger independently.

Figure 10A:
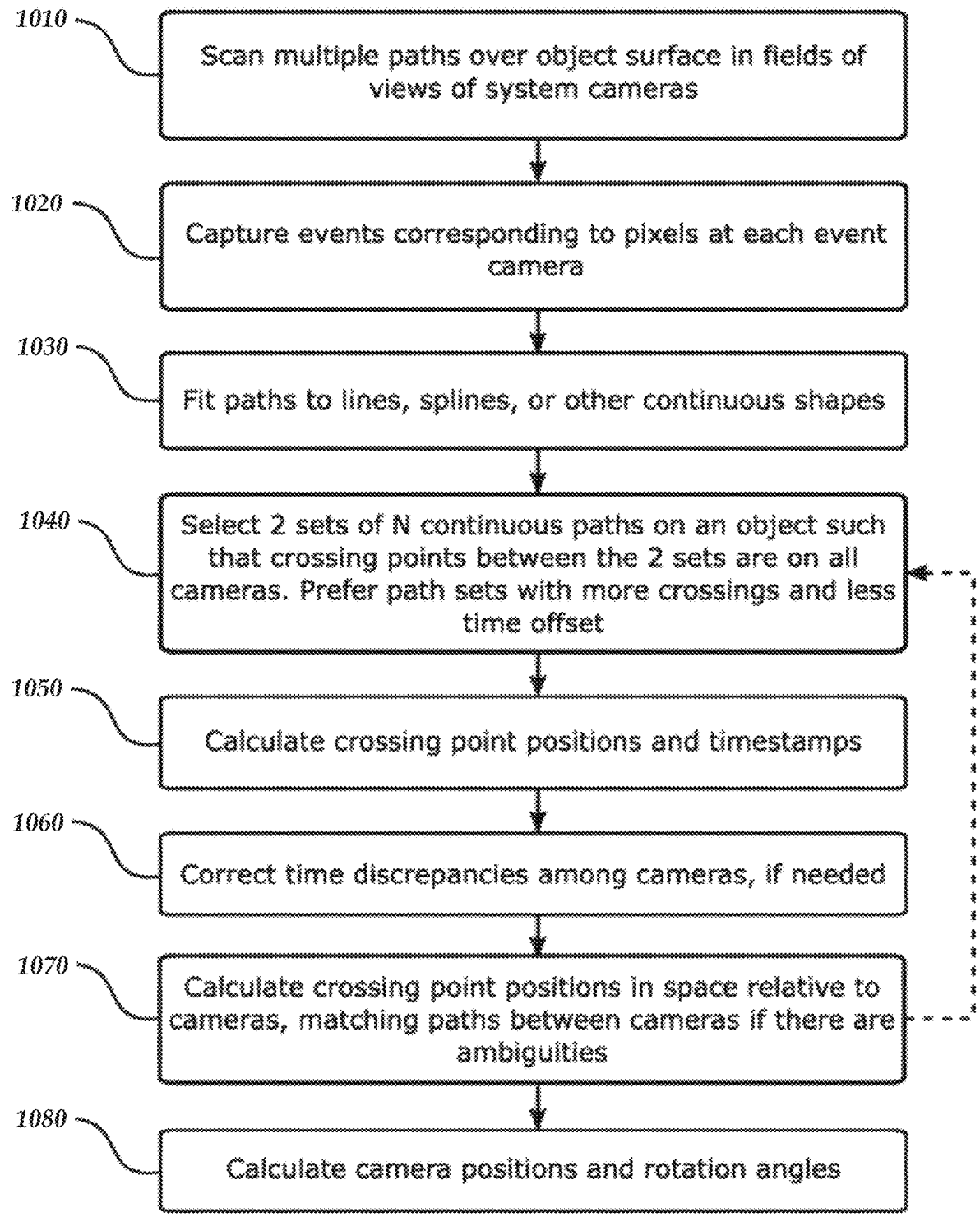
FIG. 10A illustrates a flowchart for a process for dynamic calibration of 3D acquisition systems in accordance with one or more of the various embodiments.
Figure 10B:
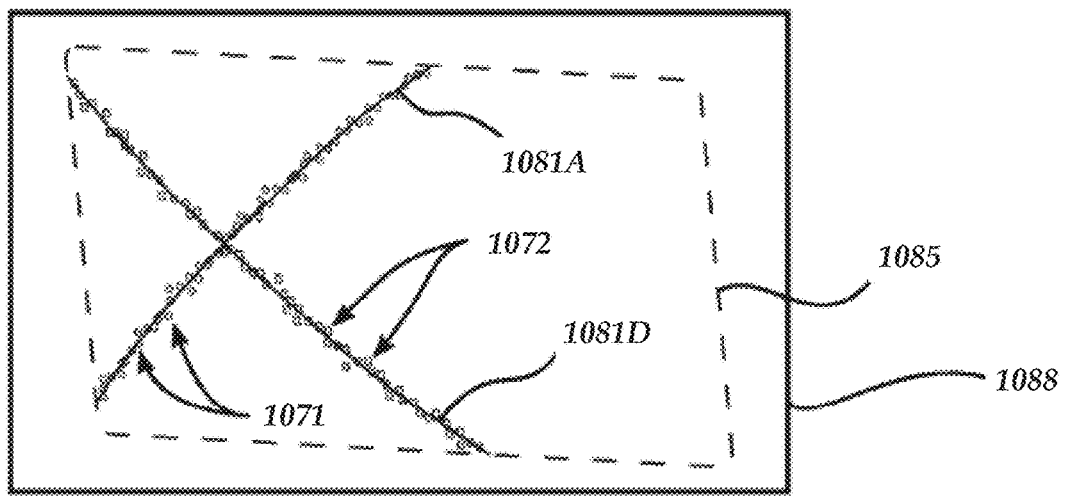
FIG. 10B shows a scenes as seen on a sensor in accordance with one or more of the various embodiments.

FIG. 10A represents generalized operations for dynamic calibration of 3D acquisition systems in accordance with one or more of the various embodiments. In one or more of the various embodiments, process 1000 described in conjunction with FIG. 10A may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the process described in conjunction with FIG. 10A may perform actions for dynamic calibration of 3D acquisition systems in accordance with at least one of the various embodiments or architectures such as those described in conjunction with FIGS. 4-7, 8A-8B, 9A-9D, 10A-10D, 11A-11C, or 12-13. Further, in one or more of the various embodiments, some or all of the actions performed by process 1000 may be executed in part by sensing engine 322, modeling engine 324, or calibration engine 326 running on one or more processors of one or more network computers.

FIG. 10A illustrates a flowchart of the steps for process 1000 for dynamic calibration of 3D acquisition systems in accordance with one or more of the various embodiments. First, in step 1010, an arbitrary number of scans of paths may be performed across the field of view of the sensors in the system. Though a certain number of paths might be captured over a scan, in an embodiment, the scanning may be a continuous process, where a subset of recent scanned paths may be chosen for analysis. While the scan may be ongoing, in step 1020 event sensors 908, 909, and 910 may continue to capture events of pixels as triggered by light at each point. Events may appear similar to points 924 and 926. Each sensor may have a different set of events based on the same stimulus (e.g., reflected signal beam, laser beam reflection, or the like). For instance, as the path of signal generator 903 traces out path 921A, events may be triggered in each of the three sensors. The shape of the path in sensor 908 may be slightly different; the shape of the path as seen by each sensor may change if each sensor observes object 905 from a different angle. Changes in shape would become more apparent if object 905 may be three-dimensional in nature and not just a flat surface as depicted in our example. In addition, sensor settings and parameters may be set differently including timing synchronization, but even if they were identical between the various sensors, response would still be different since light/signal energy reflecting or scattering off the surface of object 905 might have an angular dependence such that each sensor may observe different intensities of light/energy from that spot at that moment of time. In general, an event at one sensor may be treated as independent from other events provided by other sensors.

Next, in step 1030, the events assigned to each path may be fit to a line or other continuous curve (e.g., trajectories), including splines, Bezier curves, or others, though exact fitting methods may vary, the fit of each path may be done individually for data from each sensor. As each event point may be in the form (x, y, t), the resulting fit will be in the space and time frame of each sensor sensor. Thus, the fit curve may closely approximate the shape of the path traced out by the signal generator, but as seen from the sensor. The fit curve may be also parameterized in time, since each (x, y) point in the sensor array was also matched with a timestamp when it was reported. Examples of this may be seen in FIGS. 10B, 10C, and 10D. Also, FIG. 10B may be considered to be a diagram representing the scene in FIG. 9B as seen from one of the sensors, such as sensor 908. For brevity and clarity, data from two of the paths may be illustrated in FIGS. 10B, 10C, and 10D, though in practice events from all paths crossing the object would be captured. In this example, for some embodiments, frame 1088 represents the sensor array of sensor 908. Object 905 may be represented here as a dotted line 1085. In this example, line 1085 shows where the edges of the object 905 would be, though in practice the sensor array may not see the object itself, but only events that capture light/signal energy that may reflect off the object. Events 1071 may be similar to events 924 in FIG. 9D, which may be created from the signal generator beam spot tracing out path 921A. Path 1081A may be the curve fit path in the frame of reference of sensor 908 that may be fit from events 1071. In the same way, events 1072 may be created from the signal generator spot tracing path 921D, which may be then fit to path 1081D.

Figure 10C:
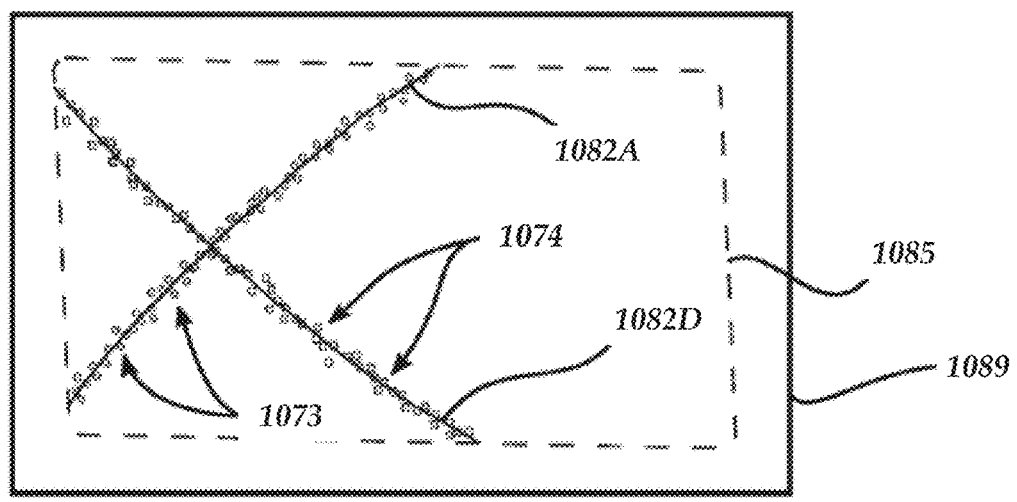
FIG. 10C shows a scenes as seen on a sensor in accordance with one or more of the various embodiments.
Figure 10D:
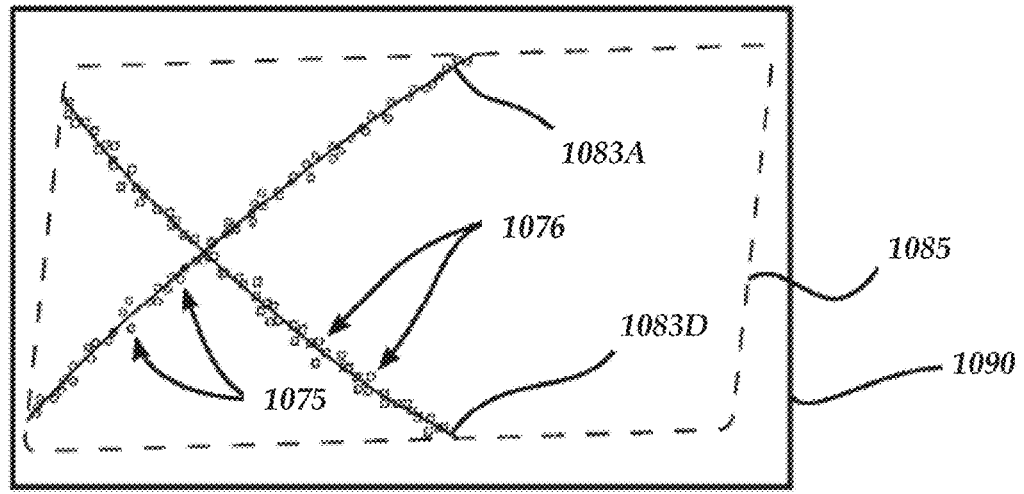
FIG. 10D shows a scenes as seen on a sensor in accordance with one or more of the various embodiments.

FIGS. 10C and 10D may be also diagrams showing the scenes as seen on sensors 1089 and 1090 of sensors 909 and 910 respectively in accordance with one or more of the various embodiments. Events 1073 and 1075 may be created during the same signal generator sweep of path 921A that created events 1071 on sensor 908, but instead may be triggered on sensors 909 and 910. In the same way, events 1074 and 1076 may be created during the same signal generator sweep of path 921D that created events 1083A, and 1083D may be the curve fit paths from events 1073, 1074, 1075, and 1076 respectively.

To summarize, paths 1081A, 1082A, and 1083A may be three curves in the sensor array space of each of the three sensors (e.g., sensor 908, sensor 909, and sensor 910), but may be all three analogs of the same path 921A traced out by the signal generator on the surface of the object. For instance, though each individual event from event points 1071 have no correspondence directly to any individual event from event points 1073, nevertheless there may be an extremely strong correlation both in shape and in time of paths 1081A and 1082A fit from the event data. Though the minimum resolution of the sensor array may be one pixel, at any point on the fit curve, the position of the curve may be determined to subpixel accuracy. Moreover, the time resolution of a point on the curve may be determined with an accuracy better than the minimum resolution of the sensor events. For example, if the time resolution of the sensor may be 1 μs, the calculated timestamp of a point on the curve might be resolvable down to 0.5 μs, 0.1 μs, or even less.

Although it may be beneficial to have increased number of crossings between various paths on an object, this is not always required. In one variant, paths may be broken by missing events or other noise, and yet they may be able to be assigned to the same path based on shape or other data from other sensors. In another variant, shorter paths with fewer crossings may be chosen; though the fit will not be quite as precise for shorter paths compared to longer paths or sets of paths which cross many times, nevertheless these crossing points may provide additional data that improves the final calibration.

In step 1040, two sets of N continuous paths may be selected for analysis. In FIG. 9C, N was chosen to be 10, where set 1 comprises paths 921A, 921B, and 921C, and set 2 comprises paths 921D, 921E, and 921F, however N may be two, three, or more paths in each set, and if convenient, the number of paths in each set may be different depending on object shape, size, or orientation. If possible, sets of paths may be chosen based on the greatest number of crossings between the two sets, up to the maximum $N^2$ in this particular example. The two sets of paths may be chosen to be substantially perpendicular to each other, but this may be not required nor necessarily preferred. The paths within each set may be chosen to be roughly parallel, but this may be also not required. Paths within each set generally may be chosen to not intersect with each other on the object.

In some embodiments, a larger number of path crossings between the sets may provide better calibration information, though some paths between the two sets that do not cross may be acceptable. In addition, when possible, it may be beneficial to select crossing paths that may be taken closer together in time. Even using a very fast scanning signal generator, individual paths may be traced out on the surface at times varying from hundreds of μs to tens of ms. This may be largely unaffected when scanning a stationary object, but if the object may be moving, crossing points of the paths may be more difficult to ascertain if the object moves enough between scans of different paths that the paths change position substantially. Nevertheless, there may be be a time difference between different scans across an object.

In some embodiments, paths in the two sets may be selected such that they may be detected by other sensors in the system. If there may be ambiguity as to the identity of each path on different sensors, this might be determined at a later step, and the process may be repeated starting back at step 1040. In the current embodiment, only one signal generator may be used to scan the object sequentially; because the paths may be created using event data using the time stamps, paths may be clearly identified by examining the range of timestamps for each path and assigning the temporal order of each path on the object. This order will be identical for the set of paths on each sensor. For instance, though at this point the three sensor paths (path 1081A, path 1082A, and path 1083A) may not be definitively matched to signal generator path 921A on object 905, all three may be determined as being associated with the same path, and a similar process may be used to match the other paths from other sensors. In another embodiment, various paths may be created using multiple scanned beams; in this case both time and other factors such as shape, path position relative to other paths, scan direction, or scan position as reported by the signal generator scanner could be used to assign and match paths.

Accordingly, in some embodiments, sensing systems may be arranged to employ rules, instructions, or the like, provided via configuration information for selecting or grouping paths into calibration sets to account for local requirements or local circumstances.

In step 1050, crossing points between each path in the first set and each path in the second set may be calculated. Crossing points may be calculated using the curves fit to the paths (e.g., trajectories). For example, crossing point 922, also referred to as crossing point 921AD may be calculated based on data from each sensor. The crossing point on the sensor array 1088 of sensor 908 may be calculated by solving for the intersection of curves 1081A and curve 1081D, leading to crossing point 1081AD. Crossing point 1081AD has four points of data, (x, y, t1, t2). x and y may be the pixel locations of the calculated crossing point, whereas t1 and t2 may be calculated crossing times. Note that the signal generator beam does not actually cross itself physically at the same time at the crossing point, but rather the beam or beams trace through that crossing point exactly at times t1, and t2. If curve 1081A was measured before curve 1081D, then t1 may be calculated from curve 1081A, and t2 may be calculated from curve 1081D right at the same (x, y) coordinates, or vice versa. Crossing points 1082AD and 1083AD may be calculated similarly. In our example, the same process may be completed for each of the other eight crossing points, for example 921AE, 921AF, 921BD, 921BE, 921BF, 921CD, 9210E, and 921CF, leading to all nine crossing points on each of the three sensors.

In some embodiments, the (x, y) coordinates as seen by sensor 908 at crossing point 1081AD may show the position of the apparent crossing point. The apparent crossing point may be where the sensor sees the two paths cross. There might exist two other timed crossing points at time t1 and time t2. A timed crossing point at time t1 may be where signal generator paths 921A and 921D would have crossed if they had been scanned at the same time and intersected the object exactly at time t1. Timed crossing point t2 may be where signal generator paths 921A and 921D would have crossed if they had been scanned at the same time and crossed the same point on the object exactly at time t2. If the object may be stationary between the two scans, then the apparent crossing point (x, y) may be substantially identical to those of both timed crossing points even if t1 and t2 may be not close together in time. When the object might move in between different paths, the apparent crossing point may not match either of the timed crossing points. If the time difference may be small, the movement of the object may affect the position of the various crossing points minimally, allowing the calculation of these positions to occur in a time-invariant manner as if the object were stationary. If this assumption may be not true, the position of the apparent crossing point may be corrected in later iterations.

In step 1060, time differences between the sensors may be checked. In one embodiment, signaling cables may connect the cables in the system to provide time synchronization, but in another embodiment, the sensors may be independent of time synchronization. Though each sensor may have its own internal clock that sufficiently holds time, to properly match the sensors and paths for later 3D measurement, times for each sensor should be coordinated. In some embodiments, time may be corrected down to better than the time resolution of each sensor by using the crossing point times. For instance, the physical signal generator crossed a particular crossing point at a given point t for each crossing point in each direction. These may be subtracted for the same crossing point at various sensors to determine the absolute time offset at each sensor. For example, crossing point 921AD, has three sets of data associated with it derived from data from the different sensors, crossing point 1081AD=($x_1$, $y_1$, $t1_1$, $t2_1$), crossing point 1082AD=($x_2$, $y_2$, $t1_2$, $t2_2$), and crossing point 1083AD=($x_3$, $y_3$, $t1_3$, $t2_3$). Each sensor has its own time clock and different perspectives of the scene, so that there might be no immediate correlation between the timestamps of the various sensors. However, the apparent crossing points as seen from each sensor will happen substantially simultaneously at each sensor. Thus, in some embodiments, the differences between timestamps may be used to calculate the delay and synchronize each sensor without the need for signaling cables. Either t1 and/or t2 may be used for this purpose. Sensor 909 has a time discrepancy compared to sensor 908 of ($t1_2$–$t1_1$), and sensor 910 has a time discrepancy compared to sensor 908 of ($t1_3$–$t1_1$). One may also calculate this using differences between t2 timestamps; to get better accuracy, these differences may be averaged over all the crossing points. In a variant, timestamp differences from various crossing points may be used in a weighted average. Once time differences may be accounted for, step 1060 may not need to be performed every time method 1000 may be performed, since time clocks of each sensor normally drift slowly.

In step 1070, the crossing points may be mapped to (X, Y, Z) coordinates in space relative to the system. In general, at least four points in (X, Y, Z) space each imaged by three sensors may be the minimum required to calculate the positions of the sensors viewing them, based on graph-rigidity theorems. In some embodiments, the crossing points of the scanning beam or beams may be used as artificial fiducial points for this purpose, as the crossings points have a specific (X, Y, Z) position at the time it may be measured, even if that may be not known.

In some embodiments, changing the number of sensors may also change the number of points needed to fix the positions. This calculation may be made without respect to time; although the timestamp of both events may be crucial in determining the crossing point locations as seen by each sensor, calculation of position may be done by using the sensor (x, y) coordinates alone. Even in an ideal case, closed form solutions may be difficult to obtain. However, by numerical approximation, the (X, Y, Z) positions of each of the artificial fiducial points, as well as the sensor (X, Y, Z) positions may be obtained.

In some embodiments, this calculation may be more precise if the (x, y) positions of each crossing point fiducial may be measured at the same time. As mentioned before, this may be true for a crossing point if object upon which the point may be measured may be stationary relative to the sensors, and so the (x, y) position data may be used directly. In conditions where objects may be translating or rotating relative to one or more sensors, the process may be slightly different. Location data of the crossing point in the sensor array reference frame may be still only the apparent crossing point, not an actual point in space. However, using the (x, y) data points without correction might still lead to an excellent first approximation of positions. In some cases, these movements might be quite small on the time scale of the scan of the paths used for the position calculation and may minimal noticeable affects on the final results. One other factor may also improve the results if an object may be in motion. Because the points measured on the surface of the object may be artificial fiducials and not tied to a specific feature on the object, the points measured between scans might change very slightly. Each of the sensors views a particular crossing point from a slightly different perspective, but sees it at almost exactly the same time. Though movement of the object may shift the (x, y) position of the apparent crossing point slightly in each sensor, it may do so in a partially correlated manner; this will lessen the effect of movement on the calculation.

In some embodiments, if the artificial fiducial positions may be known, in step 1080 the precise positions and rotation angles for the sensor DOFs may be calculated. Based on the position of the set of crossing points in each event sensor array frame of reference, the three rotational DOFs of each sensor may be determined by a best fit. Additional crossing points based on measured paths in the sensors add further constraints and will improve the accuracy of the point positions in space as well as sensor positions and rotations.

In some embodiments, a number of variations may be possible. In one embodiment, in step 1010 of method 1000, multiple paths may be still scanned over an object surface. However, in step 1040, rather than selecting multiple paths with maximal crossing points, instead consecutively scanned paths may be selected with a single crossing point. These crossing points may be selected and fit via step 1050. Once sufficient crossing points have been taken, the crossing points may be used for the rest of the process. Each crossing point will have relatively low time discrepancy between its t1 and t2 crossing times, though there may be fewer usable crossing points within a given time period than with the method as originally described.

In another embodiment, more than one signal generator may be used simultaneously to scan paths over an object or objects. System 900 may be limited in the number of spots that it may detect at once mainly by the capabilities of the event sensors. Because an event sensor may have pixels that may trigger independently from one another, events from multiple spots may be seen and paths from each spot measured together. As mentioned earlier, when multiple spots may be imaged at once, and the resulting events may be assigned to various paths in the scene, there may be some ambiguity in matching up the paths as captured at each event sensor that correspond to a path as traced out by a particular beam. Though, in some embodiments, this ambiguity may be accounted for with additional steps, nevertheless it may be in some cases advantageous to scan objects with multiple beams. For instance, if the paths measured in FIG. 9C were created by six separate beams scanning the surface substantially at the same time, time differences between the various crossing points would be greatly reduced, not only improving the sensitivity of the calibration to motion, but also speeding up the calibration process.

Figure 11A:
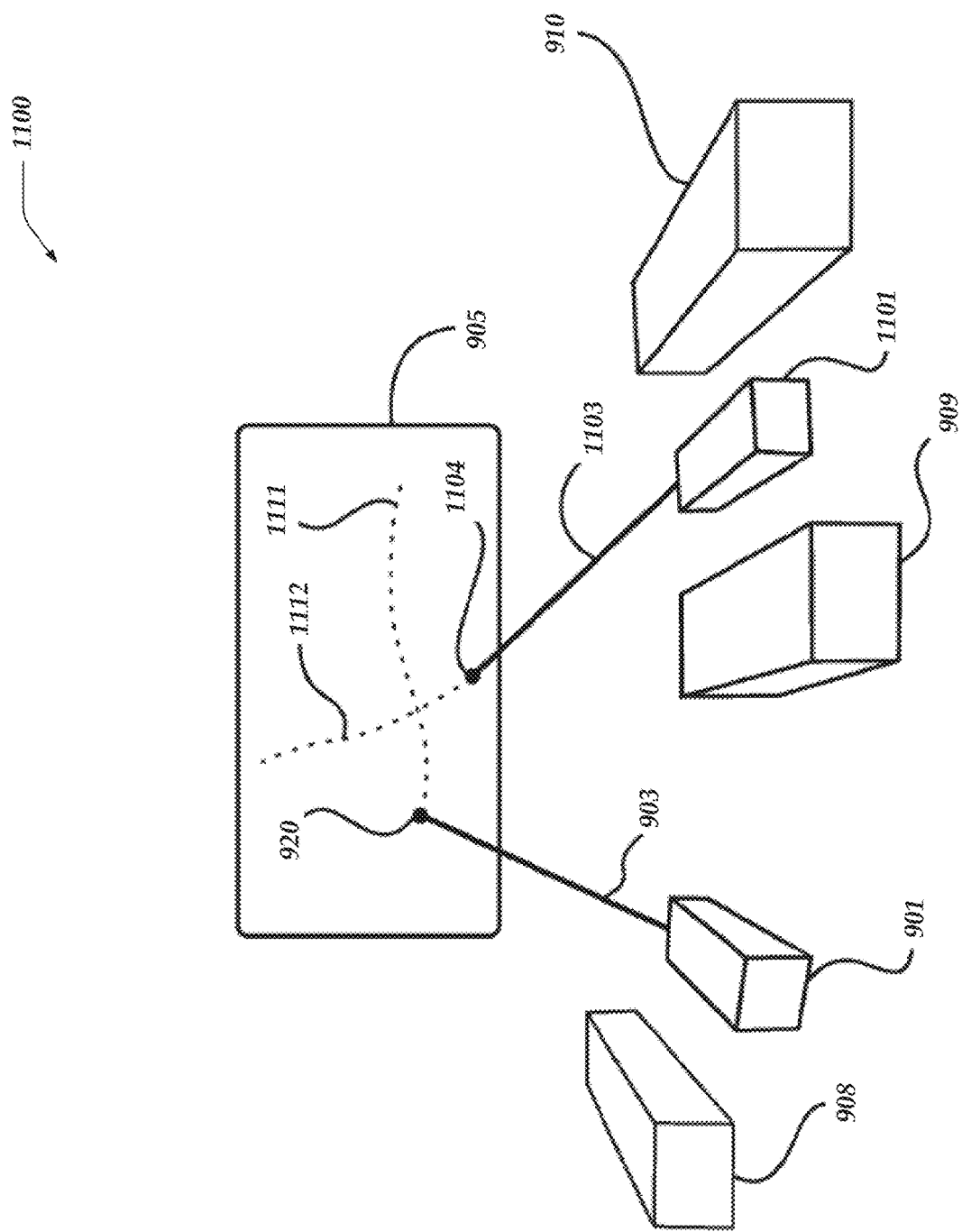
FIG. 11A illustrates a sensing system that may include additional signal generator scanning paths simultaneously with signal generator in accordance with one or more of the various embodiments.

One example of such a system may be shown in FIG. 11A. System 1100 may be similar to system 900 except that there may be an additional signal generator 1101 scanning paths simultaneously with signal generator 901. Three or more signal generators may be used as well. In one embodiment, each signal generator may be assigned a particular scanning direction. For instance, the signal generator beam 903 may be moved so that the spot 904 travels across the scene in a substantially horizontal direction, where the path 1111 moves to a different vertical position between scans to cover the entire scene more fully. Similarly, signal generator beam 1103 may be moved so that the spot 1104 moves across the scene in a substantially vertical direction.

In some embodiments, the paths as measured and fit from events captured at each event sensor could be easily assigned by general direction of the path as measured to the associated beam, and then matched using sequential timestamp data as with the single beam embodiment. In some embodiments, additional beams may be added to the system, where each new beam may be scanned in a different direction. For example, a third beam could be scanned in a diagonal upwards direction, and a fourth beam could be scanned in a diagonal downward direction. Although the shape of objects as well as differing perspectives of each sensor could change the direction of the beam somewhat, the relative positions of the beams as well as their directions should still not be difficult to ascertain.

In a variant to this embodiment, the directions assigned to each beam could be variable, as long as there may be correlation to the beams' movements. For example, both signal generators 901 and 1101 could trace out a Lissajous pattern, similar to pattern 920. Beam 1103 could be controlled so that it follows the same general pattern but may be out of phase with the pattern followed by beam 903. As long as the timing of the scanning pattern may be synchronized (either during the scan or afterwards in data analysis) with the sensor timing, it may be relatively to assign a portion of the path as being associated with a particular beam at that moment in time, and once again individual paths captured from each signal generator beam may be matched among sensors using timestamp sequencing.

Figure 11B:
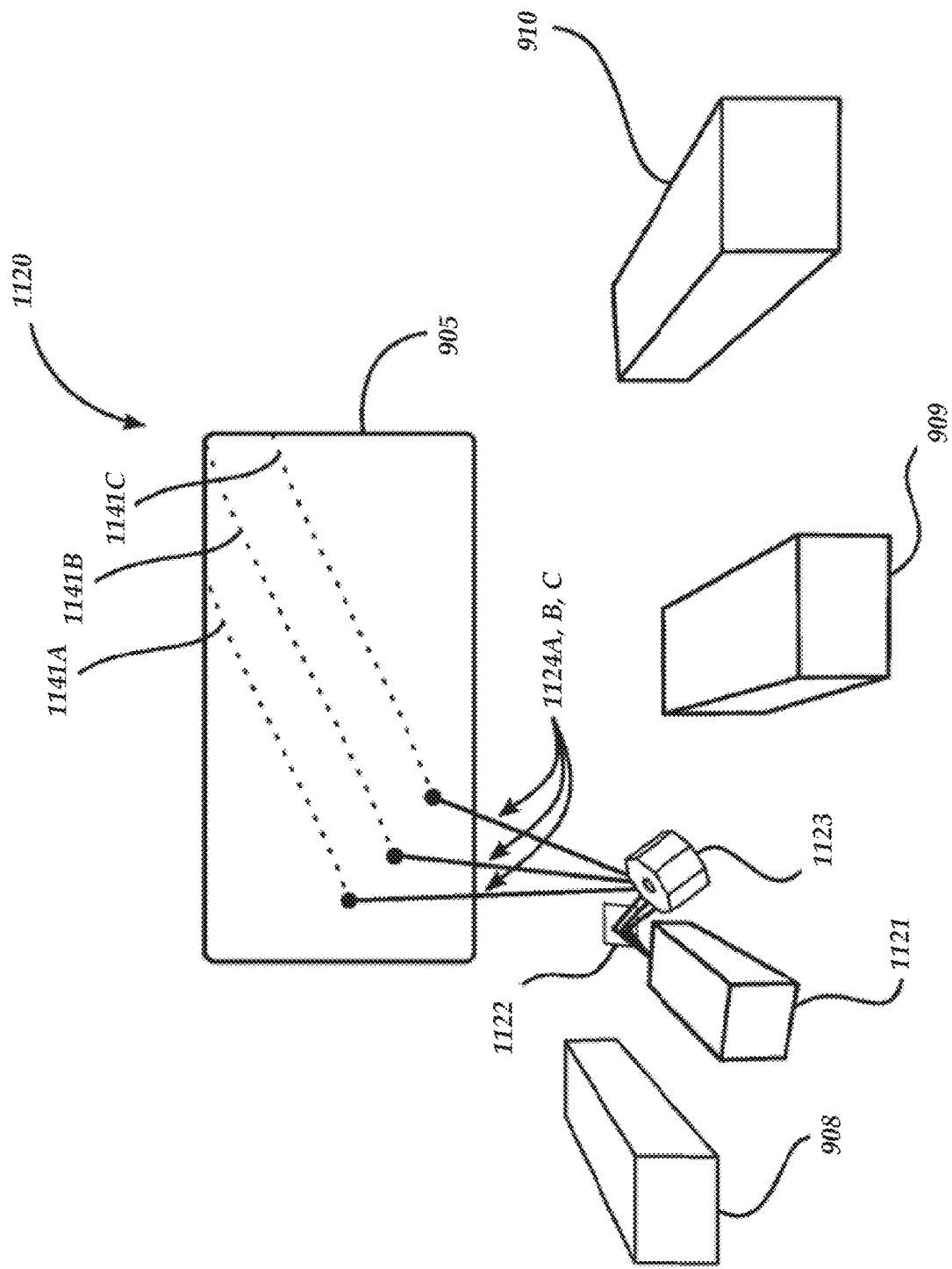
FIG. 11B show a system for another method of scanning multiple beams in accordance with one or more of the various embodiments.
Figure 11C:
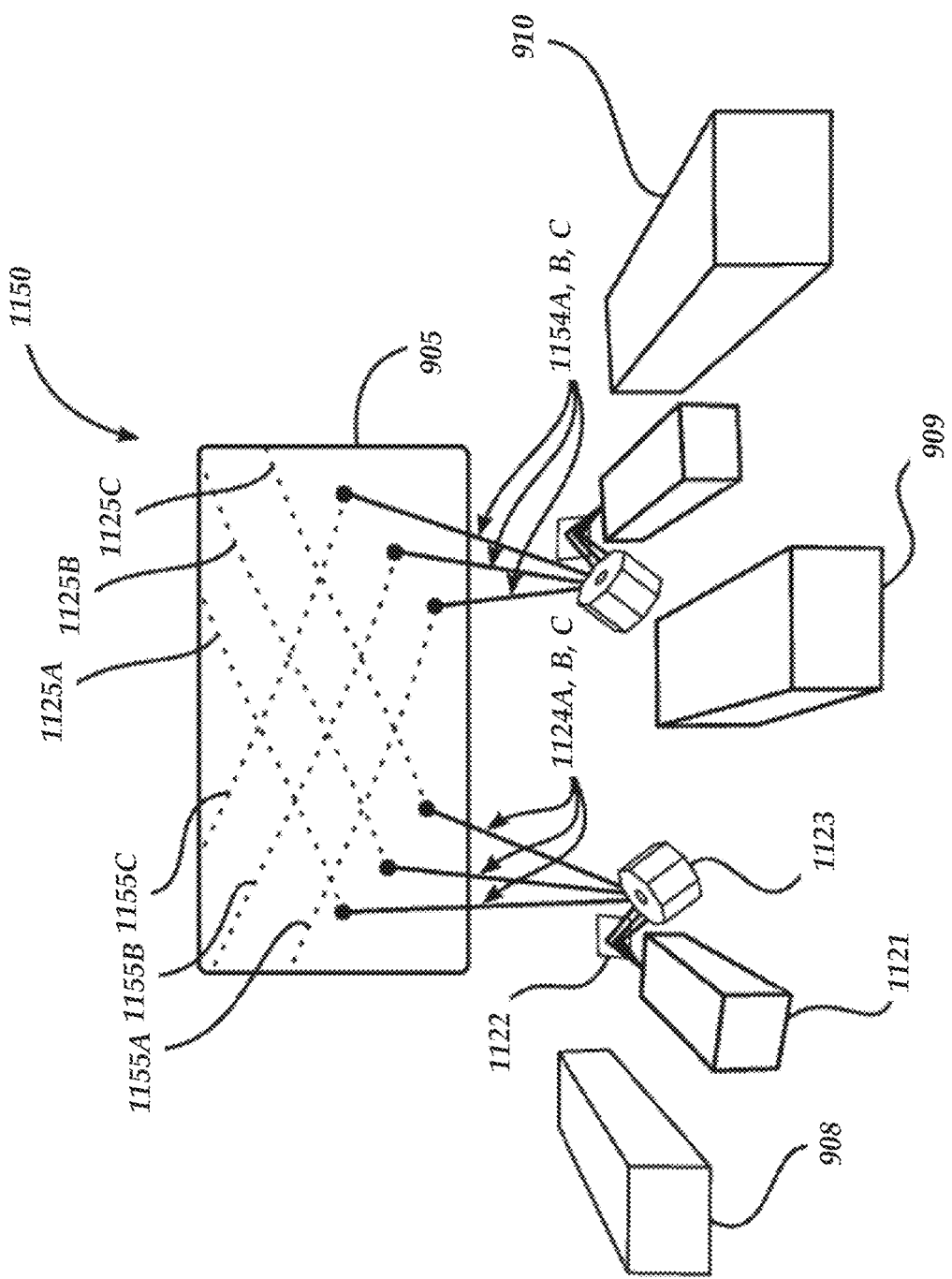
FIG. 11C shows a system for another method of scanning multiple beams in accordance with one or more of the various embodiments.

In some embodiments, position of beams might also be used to differentiate events captured. FIG. 11B shows a system 1120 with a different method of scanning multiple beams in accordance with one or more of the various embodiments. Signal Generator 1121 emits three beams, 1124A, 1124B, and 1124C, which may be reflected off of scanning mirror 1122 and then rotating polygonal mirror 1123. The beams may be split off from the signal generator 1121, but in a variant, three different signal generators may emit onto mirror 1122 instead. The two mirrors 1122 and 1123 may be shown separate from the signal generator, but they could be integrated into the signal generator subsystem as well. Beams 1124A, 1124B, and 1124Cc trace out paths 1125A, 1125B, and 1125C across the scene, in this example object 905 in a general downward left diagonal direction. Though all three beams may be moving in roughly the same direction according to each sensor that may be capturing events from the spots that they trace over, the event paths may still be distinguished from one another because of their relative positioning. Even with different perspectives, path 1141A should still appear farther left and higher in the event sensor reference frame than paths 1141B and 1141C. Though scanning of mirror 1122 may change the absolute position of the three beams together, their relative position will stay the same. In any given pass over the object, if these three event paths from the three beams have been identified, they may once again be matched in different sensors by timestamp sequencing.

In some embodiments, both position and direction may also be used to distinguish multiple paths and events. In a variant embodiment, system 1150 may be much the same as system 1120, but with the addition of another set of scanned beams. Beams 1154A, 1154B, and 1154C traces out paths 1155A, 1155B, and 1155C across the scene, here showing a downward right diagonal direction. Events triggered from paths 1155A, 1155B, and 1155C may be distinguished from paths 1125A, 1125B, and 1125C by their scanned direction, and then each of the three paths correlated by movement may be differentiated as well similar to those in system 1120. These methods of distinguishing and matching paths could also be used in a system where a different setup of signal generators creates patterns that have correlation in direction and/or position. Other variants may be possible as well; in a system where each signal generator may be modulated quickly, signal generators could be set to produce patterns in the beams sent out that may act as codes to distinguish between the beams.

Figure 12:
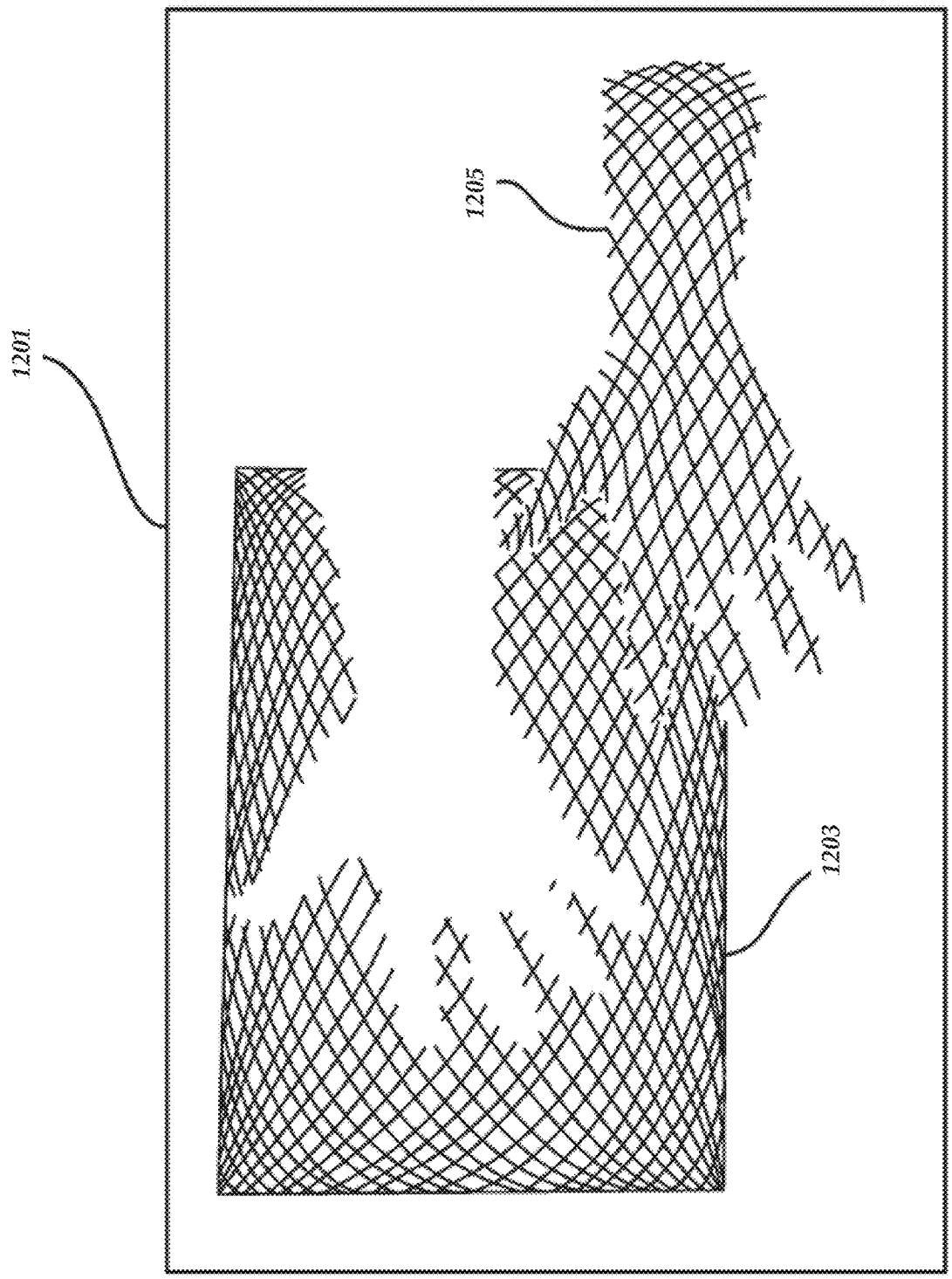
FIG. 12 shows data compiled from a number of representative paths taken across the surfaces of these two objects in accordance with one or more of the various embodiments.

Although method 1000 may be used to calibrate a scanning 3D measurement system before using it to measure 3D properties of objects, in some embodiments, method 1000 may also be continuously repeated to constantly update calibration information. Rather than using test objects for calibration, one may also use the real objects that may be being measured. In an example, system 900 may be used to scan a human hand along with another flat object. In an example, FIG. 12 shows data compiled from a number of representative paths taken across the surfaces of these two objects in accordance with one or more of the various embodiments. Frame 1201 may be considered to be a diagram of one of the sensor arrays from an event sensor such as sensor 908. Events based on scanning the two objects represent data that may be used to reconstruct the 3-D surface of each object detected. However, this data may also be used for calibration on the fly, corresponding to step 1020 of method 1000. Path sets 1203 and 1205 show fit curves from event paths off the surface of a flat object and a human hand respectively. Other event sensors in the system also capture these two objects but from a different perspective. In practice, perhaps only a subset of the paths may be fit to curve paths. Sets of crossing paths may be selected from this data set as in step 1040. Selection of continuous paths might be taken only from path set 1205, or possibly from path set 1203. In another embodiment, paths may be chosen that come from two or more object surfaces. For example, four continuous paths might be chosen from path set 1203 that have a total of four crossing points between them where the crossing points may be seen by all system sensors. Another four lines might be selected from path set 1205 that have four additional crossing points. These eight crossing points would then be calculated as in step 1050 and the rest of the method followed as normal. In another embodiment, rather than select sets of paths which cross in step 1040, instead one may select crossing points across the whole scene including points from multiple objects. Any arbitrary number of crossing points may be selected; preference may be given to crossing points which have the least time discrepancy between t1 and t2 of the crossing point, as this should lead to fewer motion artifacts. Though only a subset of crossing points may be chosen, because each of the two paths that cross may be still fit over their entire length, and so the crossing point position and timestamps may still be calculated with subpixel positional accuracy and time resolution better than the sensors.

In some embodiments, continuously or periodically updating calibration has several benefits. For instance, if one or more sensors change position or move out of alignment, the system may rapidly adjust and continue to provide 3D measurements without interruption. Rapid calibrations may enable applications that otherwise may not be possible. For example, if a 3D measurement system may be mounted on a moving vehicle, calibration may be difficult; frequent movements may loosen mounts on sensors or other optical parts of the system. Positions and angles may drift over time, but with periodic calibration, this becomes much less of an issue. Other corrections may be made for additional movements; even with very rigid mounts, it may be difficult to remove all vibrations from a system attached to a moving vehicle. Portions of the frame may vibrate at 1 Hz, 10 Hz, or even faster. In some systems, data may still be obtained in the presence of vibrations if they may be relatively small, but they may lead to blurred images with decreased ability to discern fine detail about objects. Continuous quick calibration may be much faster than these vibrations, allowing for sharp 3D reconstructions even while the system or vehicle may be vibrating.

In a separate embodiment, method 1000 may be performed iteratively to correct for motion artifacts that may be affecting calibration. If positions calculated based on measurements appear to affect calibration accuracy, this may be corrected in a by running the calibration again. In this embodiment, calibration of sensor position may be first done using apparent (x, y) crossing points through all the steps of method 1000; this should lead to a system where the true positions of the sensors may be closely known with a reasonably small error. Using these sensor positions, several successive scans of the object or objects may be taken in short time. The movements of the objects relative to the sensors may then be calculated, and then it may be determined if the amount of movement would have affected the calibration by being over a certain threshold, i.e. if the timed crossing points between t1 and t2 for each crossing point used as an artificial fiducial point would make the (x, y) position move significantly. If this may be the case, the position of the object surface may be determined over this short time, and then method 1000 may be run though again immediately. Small deltas in x and y for each crossing point may be calculated based on crossing point positions (x, y, t1, t2), such that for each point: Xcorr=x+Δx, Ycorr=y+Δy, where Δx and Δy may be the changes calculated from surface movement to correct from an apparent crossing to a timed crossing, which could be at either t1 or t2. These new crossing points may now be used in steps 1060, 1070, and 1080 to fine tune the calibration of the sensor positions. If necessary, these two steps may be repeated.

In a separate embodiment, position of each signal generator source may also be obtained and calibrated for. In a 3D measurement system that uses triangulation as its primary mode of detecting object surfaces, at least two points in the system must be known, with the ability to ascertain the third. Calibration of all of the sensors with respect to each other may be important, since once calibrated, any two of the sensors may be sufficient to measure a point or a path on a surface of an object and return that point or path's position. More sensors in the system than two may be very useful for dynamic calibration, but also to provide redundancy for when parts of the scene may be occluded from one of the sensors. Though a measurement system such as system 900 may be used to measure objects without any knowledge of the scanning signal generator's position or current scanning angle, the scanning signal generator may also act as one of the points of triangulation if its position may be known well with respect to the sensors. System 900 traces points continuously over the surface of objects. All sensors in the system may see each point as it may be reflected off the surface because most objects reflect light diffusely or otherwise scatter it in an angular distribution from the point. Highly reflective smooth surfaces may be challenging for scanning systems to measure well. In the normal mode, because the spots have diffuse reflections, it may be difficult to exactly reverse calculate the positional degrees of freedom of the signal generator with respect to the sensors. However, if information may be known about the scanning position of the signal generator at any given time, approximate positions may be calculated. This may be particularly true if the time synchronization of the signal generator's scanning position may be matched with timestamps on each event sensor. In one embodiment, this may be achieved by modulating the signal generator in a recognizable pattern. Nevertheless, even with knowledge of the beam's angular position over time, knowledge the signal generator beam origin point's position may be improved, but some error may remain.

In one embodiment, the position of the signal generator with respect to each system sensor may be determined opportunistically. During scanning of objects, occasionally the signal generator may scan over a point on the object where the beam's specular reflection points directly into the sensor. Event sensors may be tuned to trigger only on the center of a scanned path so that measured continuous paths may be narrower and may be characterized more accurately. A specular reflection may produce a temporary spike in power as measured, which may lead to a wider number of events surrounding that particular spot center. Since the object being scanned may be characterized completely, including the surface normal at the point where the specular reflection hit, the angle of the position of the signal generator may be traced back. If this happens successively with one or more of the other sensors, the position of the signal generator may be found from the intersection of those back-traced beams. In a variant, if the approximate location of the signal generator may be known, then the signal generator may be scanned over an object in a narrow range likely to cause a detectable specular reflection.

Figure 13:
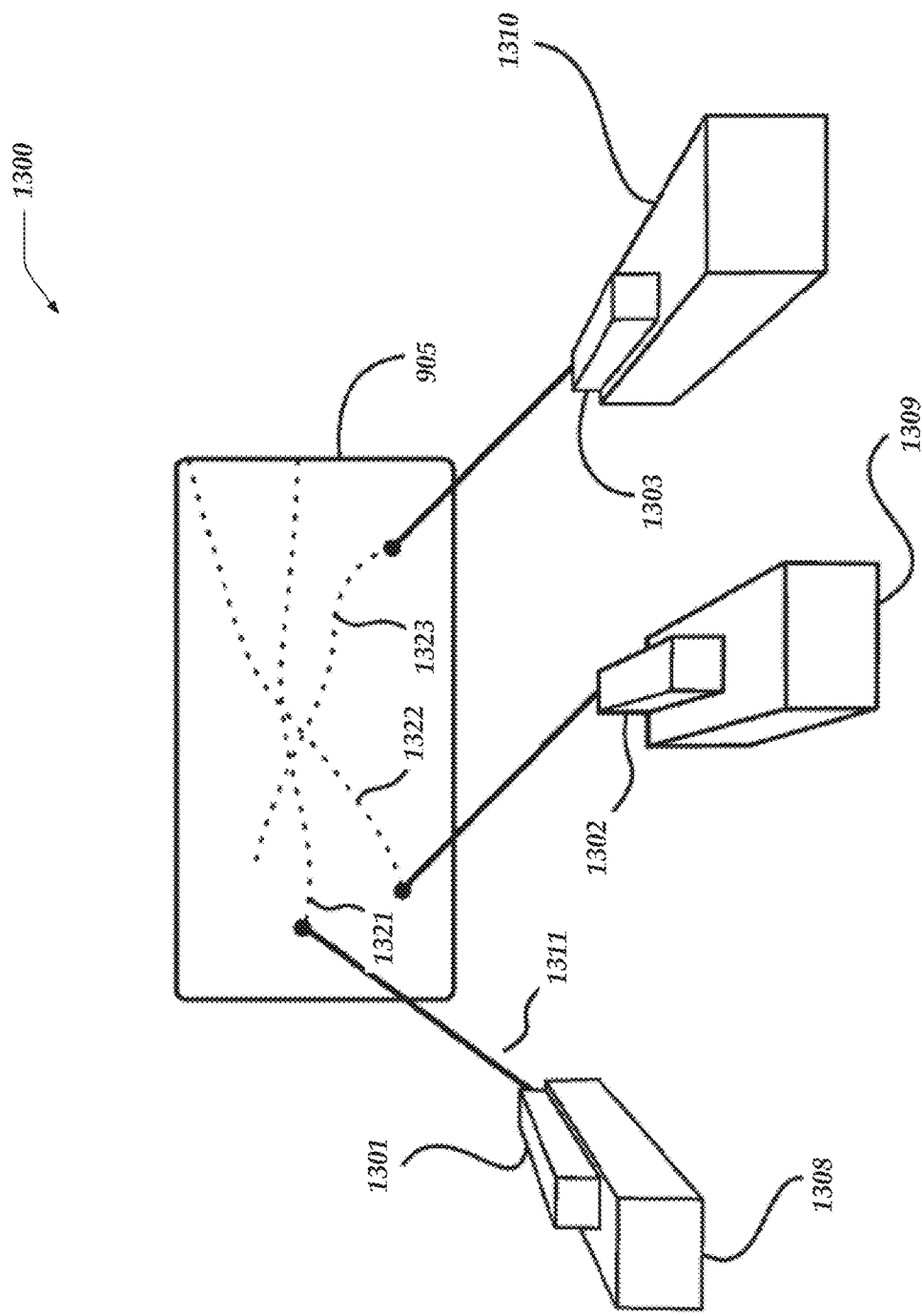
FIG. 13 shows a system for another method of scanning multiple beams in accordance with one or more of the various embodiments.

In another system embodiment, the positions of the signal generators may already be known. FIG. 13 shows a system 1300, similar to that of systems 900 and 1100, but where the signal generators may be nearly co-located with the sensors. In this example, three signal generators may be used, but only one or two may be possible. System 1300 could alternatively contain an additional signal generator not located near any of the sensors. A scanning signal generator 1301 may be mounted so that its aperture may be as close as possible to the sensor 1308 input. If objects measured may be sufficiently distant, this difference may appear small. In any case, the small offset may be known and may be accounted for. Similarly, a scanning signal generator 1302 may be mounted near sensor 1309, and a scanning signal generator 1303 may be mounted near sensor 1310. Various paths 1321, 1322, and 1323 may be traced out simultaneously on the surface, with triangulation possible by either sensor or signal generator positions.

Furthermore, it will be understood that each block in flowchart illustration FIG. 10A, and combinations of blocks in flowchart FIG. 10A, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of flowchart FIG. 10A to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, each block in the flowchart illustration supports combinations of means for performing the specified actions, combinations of steps for performing the specified actions and program instruction means for performing the specified actions. It will also be understood that each block in the flowchart illustration, and combinations of blocks in the flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowchart may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a micro-controller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for calibrating sensors using one or more processors that are configured to execute instructions, wherein the instructions perform actions, comprising:
    detecting a plurality of signals, by two or more sensors, for one or more signal beams that are reflected by an object, wherein the one or more signal beams are scanned over a plurality of paths across the object;
    determining a plurality of events associated with the two or more sensors based on the plurality of detected signals and the plurality of paths;
    determining a plurality of crossing points for each sensor based on one or more intersections of the plurality of paths with the scanned object and a time of the intersection, wherein one or more events associated with each sensor are associated with the plurality of crossing points for each sensor;
    comparing each crossing point of each sensor to each correspondent crossing point of each other sensor based on one or more event metrics; and
    determining one or more actual crossing points by performing further actions, comprising:
        determining a time associated with each crossing point for each sensor based on the plurality of events and the one or event metrics;
        determining one or more absolute time offsets between each sensor based on the time associated with each crossing point for each sensor; and
        employing the one or more absolute time offsets to synchronize the crossing points across the two or more sensors.

2. The method of claim 1, wherein the determination of the plurality of crossing points further comprises:
    selecting the plurality of crossing points based on minimization of a period of time between one or more occurrences of the plurality of crossing points.

3. The method of claim 1, further comprising:
    repeating the method for calibration based on determination of a change in a position of at least one of the two or more sensors.

4. The method of claim 1, further comprising:
    detecting motion for the scanned object based on one or more motion vectors associated with the scanned object;
    determining a plurality of actual crossing points for each sensor based on the detected motion of the scanned object; and
    repeating the method for calibration based on the detected motion of the scanned object.

5. The method of claim 1, wherein the one or more event metrics further comprise a location and a time for one or more of the plurality of events.

6. The method of claim 1, further comprising:
    determining a position and a rotation angle for each degree-of-freedom for each sensor based each actual crossing point.

7. The method of claim 1, further comprising:
    employing one or more signal generators to generate a plurality of signal beams with one or more characteristics that distinguish each signal beam from each other signal beam, wherein the one or more characteristics include one or more of a different scanning path, a different signal frequency, or a different signal pulse-pattern.

8. A processor readable non-transitory storage media that includes instructions that are configured to enable calibration of sensors, wherein execution of the instructions, by one or more processors on one or more network computers, causes performance of actions, comprising:
    detecting a plurality of signals, by two or more sensors, for one or more signal beams that are reflected by an object, wherein the one or more signal beams are scanned over a plurality of paths across the object;
    determining a plurality of events associated with the two or more sensors based on the plurality of detected signals and the plurality of paths;
    determining a plurality of crossing points for each sensor based on one or more intersections of the plurality of paths with the scanned object and a time of the intersection, wherein one or more events associated with each sensor are associated with the plurality of crossing points for each sensor;
    comparing each crossing point of each sensor to each correspondent crossing point of each other sensor based on one or more event metrics; and
    determining one or more actual crossing points by performing further actions, comprising:
        determining a time associated with each crossing point for each sensor based on the plurality of events and the one or event metrics;
        determining one or more absolute time offsets between each sensor based on the time associated with each crossing point for each sensor; and
        employing the one or more absolute time offsets to synchronize the crossing points across the two or more sensors.

9. The processor readable non-transitory storage media of claim 8, wherein the determination of the plurality of crossing points further comprises:
    selecting the plurality of crossing points based on minimization of a period of time between one or more occurrences of the plurality of crossing points.

10. The processor readable non-transitory storage media of claim 8, further comprising:

repeating the method for calibration based on determination of a change in a position of at least one of the two or more sensors.

11. The processor readable non-transitory storage media of claim 8, further comprising:
   detecting motion for the scanned object based on one or more motion vectors associated with the scanned object;
   determining a plurality of actual crossing points for each sensor based on the detected motion of the scanned object; and
   repeating the method for calibration based on the detected motion of the scanned object.

12. The processor readable non-transitory storage media of claim 8, wherein the one or more event metrics further comprise a location and a time for one or more of the plurality of events.

13. The processor readable non-transitory storage media of claim 8, further comprising:
   determining a position and a rotation angle for each degree-of-freedom for each sensor based each actual crossing point.

14. The processor readable non-transitory storage media of claim 8, further comprising:
   employing one or more signal generators to generate a plurality of signal beams with one or more characteristics that distinguish each signal beam from each other signal beam, wherein the one or more characteristics include one or more of a different scanning path, a different signal frequency, or a different signal pulse-pattern.

15. A network computer for calibrating sensors, comprising:
   a memory that stores at least instructions; and
   one or more processors that are configured to execute instructions that are configured to cause performance of actions, including:
      detecting a plurality of signals, by two or more sensors, for one or more signal beams that are reflected by an object, wherein the one or more signal beams are scanned over a plurality of paths across the object;
      determining a plurality of events associated with the two or more sensors based on the plurality of detected signals and the plurality of paths;
      determining a plurality of crossing points for each sensor based on one or more intersections of the plurality of paths with the scanned object and a time of the intersection, wherein one or more events associated with each sensor are associated with the plurality of crossing points for each sensor;
      comparing each crossing point of each sensor to each correspondent crossing point of each other sensor based on one or more event metrics; and
      determining one or more actual crossing points by performing further actions, comprising:
         determining a time associated with each crossing point for each sensor based on the plurality of events and the one or event metrics;
         determining one or more absolute time offsets between each sensor based on the time associated with each crossing point for each sensor; and
         employing the one or more absolute time offsets to synchronize the crossing points across the two or more sensors.

16. The network computer of claim 15, wherein the determination of the plurality of crossing points further comprises:
   selecting the plurality of crossing points based on minimization of a period of time between one or more occurrences of the plurality of crossing points.

17. The network computer of claim 15, further comprising:
   repeating the method for calibration based on determination of a change in a position of at least one of the two or more sensors.

18. The network computer of claim 15, further comprising:
   detecting motion for the scanned object based on one or more motion vectors associated with the scanned object;
   determining a plurality of actual crossing points for each sensor based on the detected motion of the scanned object; and
   repeating the method for calibration based on the detected motion of the scanned object.

19. The network computer of claim 15, wherein the one or more event metrics further comprise a location and a time for one or more of the plurality of events.

20. The network computer of claim 15, further comprising:
   determining a position and a rotation angle for each degree-of-freedom for each sensor based each actual crossing point.

21. The network computer of claim 15, further comprising:
   employing one or more signal generators to generate a plurality of signal beams with one or more characteristics that distinguish each signal beam from each other signal beam, wherein the one or more characteristics include one or more of a different scanning path, a different signal frequency, or a different signal pulse-pattern.

* * * * *